(12) United States Patent
Bhojan

(10) Patent No.: US 8,196,061 B1
(45) Date of Patent: Jun. 5, 2012

(54) METHOD AND SYSTEM FOR PROVIDING SCROLL BAR ENABLED BOOKMARKS IN ELECTRONIC DOCUMENT DISPLAYS

(75) Inventor: Narendran Bhojan, Bangalore (IN)

(73) Assignee: Intuit Inc., Mountain View, CA (US)

( * ) Notice: Subject to any disclaimer, the term of this patent is extended or adjusted under 35 U.S.C. 154(b) by 727 days.

(21) Appl. No.: 12/346,501

(22) Filed: Dec. 30, 2008

(51) Int. Cl.
*G06F 3/048* (2006.01)

(52) U.S. Cl. ...................................................... 715/787

(58) Field of Classification Search .................. 715/739, 715/783, 786, 787, 784, 785, 830, 833, 839
See application file for complete search history.

(56) References Cited

U.S. PATENT DOCUMENTS

| | | | |
|---|---|---|---|
| 6,147,683 A * | 11/2000 | Martinez et al. | 715/786 |
| 6,738,084 B1 * | 5/2004 | Kelley et al. | 715/784 |
| 2005/0005246 A1 * | 1/2005 | Card et al. | 715/776 |
| 2006/0036942 A1 * | 2/2006 | Carter | 715/526 |

* cited by examiner

*Primary Examiner* — Thanh Vu
(74) *Attorney, Agent, or Firm* — McKay and Hodgson, LLP; Philip McKay; Sean P. Lewis

(57) ABSTRACT

A system and method for providing scroll bar enabled bookmarks in electronic document displays whereby a bookmark enabled scroll bar is provided as a feature associated with a displayed electronic document. The bookmark enabled scroll bar includes one or more bookmark sequencing buttons. When a user desires to mark a portion of an electronic document for future reference, the user activates the bookmark enabled scroll bar and places/creates a bookmark/breakpoint at a location in the bookmark enabled scroll bar corresponding the portion of the electronic document the user wishes to bookmark for future reference. Once the user activates the bookmark enabled scroll bar and creates the bookmark, a visual indicator appears in the bookmark enabled scroll bar at the selected location corresponding to the portion of the electronic document the user wishes to bookmark for future reference. Then when the user desires to return to the portion of the electronic document the user bookmarked for future reference, the user activates one of the one or more bookmark sequencing buttons and the user is taken to the corresponding portion of the electronic document the user had bookmarked using the bookmark enabled scroll bar.

32 Claims, 5 Drawing Sheets

METHOD AND SYSTEM FOR PROVIDING SCROLL BAR ENABLED BOOKMARKS IN ELECTRONIC DOCUMENT DISPLAYS

BACKGROUND

With the emergence and proliferation of computer systems, and the Internet, in both personal and business settings, electronic data has become the media of choice for almost all personal and business documents. In addition, consistently increasing data storage and transmission capabilities have resulted in the ability to create, store, and transmit, virtually any size document in any one of numerous electronic formats. As a result, more and more electronic documents are being created, reviewed, shared, and/or read, without ever having been put in a printed and/or "hard-copy" format. Not only does this help reduce the cost of creating and reviewing documents, it also significantly reduces the environmental impact of document creation, distribution, and review.

However, one of the unforeseen issues with electronic documents, and electronic document review, is that, using current document creation and viewing systems, when a reader/reviewer of a given electronic document wishes to refer back to a given section of the electronic document, the reader/viewer of the electronic document often finds they must scan through large portions of the electronic document to find the given section of interest. This is a problem for virtually any electronic document, but it is a particularly significant issue with large electronic documents, and/or complicated electronic documents, and/or professional electronic documents, and/or business electronic documents.

As a specific example, a particular definition of a term in the text of an electronic document may be presented in one section of the electronic document and then the term and/or definition may referred to at several other locations in the electronic document. Currently, if the reader/viewer of the electronic document wishes to re-read, or otherwise refer back to, the definition of the term, the reader/viewer of the electronic document must try to remember where the definition appeared in the electronic document and then scan through the electronic document to find the given section that includes the desired term definition.

Not only is the current search and find process described above time consuming and frustrating for the reader/viewer of the electronic document, but it also often causes the reader/viewer to break concentration, lose focus, and/or lose context. In addition, the search and find process described above must often be repeated for several terms and/or sections in a single electronic document.

In some cases, and typically out of desperation, some readers/viewers of electronic documents currently add one or more keyboard symbols to the actual text of the electronic document, such as an a asterisk "*" and then use a "find symbol" function to relatively quickly return to the section desired and marked with the more or more symbols. However, this process involves not only adding text symbols to the electronic document, which in turn requires an edit capability and/or permissions within the electronic document, but it also requires the readers/viewers of electronic documents to enter the desired symbols, recall the symbols used, then to implement/activate the "find" function and then re-enter the chosen symbols and wait while the system searches out and finds the chosen symbols. In addition, if the readers/viewers of electronic documents happen to choose a symbol that is actually used in the electronic document, the process only creates confusion and wastes even more reader/reviewer time.

These shortcomings of currently available electronic document creation and/or viewing systems largely result from the fact that, using current electronic document creation and/or viewing systems, the reader/reviewer of the electronic document is not provided a dedicated, simple, and unobtrusive capability to mark a given location in the electronic document so that the reader/viewer can return to the marked location quickly, and without having to scroll through the document and search for the given section of interest.

SUMMARY

In accordance with one embodiment, a system and method for providing scroll bar enabled bookmarks in electronic document displays includes a process for providing scroll bar enabled bookmarks in electronic document displays whereby a bookmark enabled scroll bar is provided as a feature associated with a displayed electronic document on a display device and/or a computing system. In one embodiment, the bookmark enabled scroll bar includes one or more bookmark sequencing buttons. In one embodiment, when a reader/reviewer of an electronic document, herein also referred to as a user, desires to mark a portion of an electronic document for future reference, the user places a bookmark/breakpoint in the bookmark enabled scroll bar at a location on the bookmark enabled scroll bar corresponding to the portion of the electronic document the user wishes to bookmark for future reference. In one embodiment, once the user places a bookmark/breakpoint in the bookmark enabled scroll bar at a location on the bookmark enabled scroll bar corresponding to the portion of the electronic document the user wishes to bookmark for future reference, a visual indicator appears in the bookmark enabled scroll bar at the selected location corresponding to the portion of the electronic document the user wishes to bookmark for future reference. In one embodiment, when the user desires to return to the portion of the electronic document the user bookmarked for future reference, the user activates one of the one or more bookmark sequencing buttons and the user is taken to the corresponding portion of the electronic document the user had bookmarked using the bookmark enabled scroll bar.

In one embodiment, the bookmark enabled scroll bar is provided as a feature associated with an electronic document displayed on any display device discussed herein, and/or known in the art at the time of filing, and/or as developed after the time of filing. In one embodiment, the display device is associated with any computing system discussed herein, and/or known in the art at the time of filing, and/or as developed after the time of filing. Herein, the term "computing system", includes, but is not limited to: a desk top computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, the bookmark enabled scroll bar is provided as a feature associated with a computing system data management system, such as a computing system implemented word processing system and/or a computing system implemented spread sheet system. In one embodiment, the bookmark enabled scroll bar is provided as a feature associated with a computing system document display system, such as a PDF document display system or a bitmap document display system. In one embodiment, the bookmark enabled scroll bar is provided as an add-on feature associated with a computing system data management system and/or computing system document display system. In one embodiment, the bookmark enabled scroll bar is provided as an independent system that is then associated with a computing system data management system and/or computing system document display system. In one embodiment, the bookmark enabled scroll bar is otherwise implemented, accessed by, provided by, and/or otherwise associated with a computing system data management system and/or computing system document display system.

In one embodiment, the one or more bookmark sequencing buttons take the form of "up" and/or "down" arrow buttons that, in one embodiment, are provided in addition to the standard scroll bar "up" and "down" buttons as a second set of "up" and "down" arrows within the scroll bar itself. In one embodiment, the one or more bookmark sequencing buttons are color-coded arrows, blocks, or other symbols that, as discussed in more detail below, correspond to color-coded, and/or symbol-coded, and/or number-coded, bookmarks and/or bookmark visual indicators. In some of these embodiments, the color-coded, and/or symbol-coded, and/or number-coded, bookmark visual indicators correspond to specific portions/topics of the electronic document. In some of these embodiments, the color-coded, and/or symbol-coded, and/or number-coded, bookmarks correspond to different users. In some of these embodiments, the color-coded, and/or symbol-coded, and/or number-coded, bookmarks correspond to any coding scheme desired by the user.

In one embodiment, when the user desires to mark a portion of an electronic document for future reference, the user activates the bookmark enabled scroll bar and places/creates a bookmark/breakpoint at a location in the bookmark enabled scroll bar corresponding the user wishes to bookmark for future reference via a user interface device, such as defined herein, and/or using any other device and/or system for converting one or more user actions into computing system based instructions as discussed herein, and/or as known in the art at the time of filing, and/or as developed after the time of filing.

For instance, in one embodiment, when the user desires to mark a portion of an electronic document for future reference, the user activates the bookmark enabled scroll bar and places/creates a bookmark/breakpoint at a location in the bookmark enabled scroll bar corresponding desired to be bookmarked by using a user interface device, such as a mouse, keyboard, touch screen, or touch pad, to move a cursor over the bookmark enabled scroll bar at a location corresponding to the portion of the electronic document desired to be bookmarked.

In one embodiment, when the user desires to mark a portion of an electronic document for future reference, the user activates the bookmark enabled scroll bar and places/creates a bookmark/breakpoint at a location in the bookmark enabled scroll bar corresponding desired to be bookmarked by using a user interface device, such as a mouse, keyboard, touch screen, or touch pad, to move a cursor over the location in the bookmark enabled scroll bar corresponding to the portion of the electronic document desired to be bookmarked and hovering it over the desired location in the bookmark enabled scroll bar.

In one embodiment, when the user desires to mark a portion of an electronic document for future reference, the user activates the bookmark enabled scroll bar and places/creates a bookmark/breakpoint at a location in the bookmark enabled scroll bar corresponding desired to be bookmarked using a user interface device, such as a mouse, keyboard, touch screen, or touch pad, to move a cursor over the desired enabled scroll bar location and clicking on the desired enabled scroll bar location.

In one embodiment, activation of the cursor causes pop-up menus to be displayed that include selectable features, such as a color code, symbol code, or number code, associated with the eventual bookmark visual marker to be displayed and/or made user selectable.

In one embodiment, the cursor acts as a "tool tip" to cause selectable features, such as a color code, symbol code, or number code, associated with the eventual bookmark visual marker to be displayed and/or made user selectable.

Other examples of actions a given user could take to activate the bookmark enabled scroll bar at a location corresponding to the portion of the electronic document desired to be bookmarked include, but are not limited to: voice commands; pressing a menu and/or function key on a remote control device; accessing a channel and/or link associated with the electronic document; or any other action/inaction on the part of the given user whereby the bookmark enabled scroll bar is activated and a location corresponding to the portion of the electronic document desired to be bookmarked is selected and/or identified, as discussed herein, known/available in the art at the time of filing, or as developed after the time of filing.

In one embodiment, data indicating the location in the bookmark enabled scroll bar activated, and/or the corresponding portion of the electronic document selected, and/or the type of bookmark selected, and/or selected features associated with the bookmark selected, is stored in a data storage device such as any main memory or mass memory associated with a computing system, in any server system, in any database, or on/in computer readable medium, and/or any other computer program product, as defined herein. In one embodiment, the data, in whole, or in part, is stored on a webpage or in a web-based system, or any other data storage system, or by any other data storage method, discussed herein, and/or known in the art at the time of filing, and/or as developed after the time of filing.

As noted above, in one embodiment, the cursor acts as a "tool tip", or causes a pop-up menu to be displayed, that includes selectable features, such as a color code, symbol code, or number code, to be associated with the eventual bookmark visual indicator to be displayed and/or made user selectable. In one embodiment, once the user activates the bookmark enabled scroll bar, the visual indicator that appears in the bookmark enabled scroll bar at the selected location corresponding to the portion of the electronic document the user wishes to bookmark is color-coded, symbol-coded, and/or number-coded according to the user's selection.

As also discussed above, in some embodiments, the one or more bookmark sequencing buttons are color-coded arrows, blocks, or other symbols that, as discussed in more detail below, correspond to the color-coded, and/or symbol-coded, and/or number-coded, bookmark visual indicators. As noted above, in some of these embodiments, the color-coded, and/or symbol-coded, and/or number-coded, bookmark visual indicators correspond to specific portions/topics of the electronic document. In some of these embodiments, the color-coded, and/or symbol-coded, and/or number-coded, bookmarks correspond to different users. In some of these embodiments, the color-coded, and/or symbol-coded, and/or number-coded, bookmarks correspond to any coding scheme desired by the user.

In one embodiment, when the user desires to return to the portion of the electronic document the user bookmarked for future reference, the user activates one of the one or more bookmark sequencing buttons via a user interface device, such as defined herein, and/or using any other device and/or system for converting one or more user actions into computing system based instructions as discussed herein, and/or as known in the art at the time of filing, and/or as developed after the time of filing.

For instance, in one embodiment, when the user desires to return to the portion of the electronic document the user bookmarked for future reference, the user activates one of the one or more bookmark sequencing buttons by using a user interface device, such as a mouse, keyboard, touch screen, or touch pad, to move a cursor over the desired bookmark sequencing button.

In one embodiment, when the user desires to return to the portion of the electronic document the user bookmarked for future reference, the user activates one of the one or more bookmark sequencing buttons by using a user interface device, such as a mouse, keyboard, touch screen, or touch pad, to move a cursor over the desired bookmark sequencing button and hovering it over the desired bookmark sequencing button.

In one embodiment, when the user desires to return to the portion of the electronic document the user bookmarked for future reference, the user activates one of the one or more bookmark sequencing buttons using a user interface device, such as a mouse, keyboard, touch screen, or touch pad, to move a cursor over the desired bookmark sequencing button and clicking on the desired bookmark sequencing button.

In one embodiment, activation of the cursor causes pop-up menus to be displayed that include selectable features, such as a color code, symbol code, or number code, associated with the bookmark sequencing button to be displayed and/or made user selectable.

In one embodiment, the cursor acts as a "tool tip" to cause selectable features for the bookmark sequencing button, such as a color code, symbol code, or number code, associated with the desired bookmark sequencing button, and bookmark visual marker, and to be displayed and/or selected.

In addition, in some embodiments, two or more users can code multiple bookmarks by the user creating the bookmark. Then, in one embodiment, a given user can filter all bookmarks associated with other users and view only his or her bookmarks as indicated by the code associated with the user and the user's bookmarks.

Other examples of actions a given user could take to activate one of the one or more bookmark sequencing buttons include, but are not limited to: voice commands; pressing a menu and/or function key on a remote control device; accessing a channel and/or link associated with the one or more bookmark sequencing buttons; or any other action/inaction on the part of the given user whereby one of the one or more bookmark sequencing buttons is selected and/or identified, as discussed herein, known/available in the art at the time of filing, or as developed after the time of filing.

In one embodiment, when the user activates one of the one or more bookmark sequencing buttons, the user is taken to the portion of the electronic document corresponding to the next, or closest, bookmark associated with the activated bookmark sequencing button selected.

Using the process for providing scroll bar enabled bookmarks in electronic document displays, as disclosed herein, the reader/reviewer of the electronic document, i.e., a user of the process for providing scroll bar enabled bookmarks in electronic document displays, is provided a dedicated, simple, and unobtrusive capability to bookmark a given location in the electronic document so that the user can return to the bookmarked location quickly and without having to scroll through the document and search for the given section of interest. In addition, in some embodiments, one or more users can code multiple bookmarks by subject matter and/or the user creating the bookmark. In addition, in one embodiment, a given user can view only his or her bookmarks as indicated by the code associated with the user and the user's bookmarks.

Consequently, using the process for providing scroll bar enabled bookmarks in electronic document displays, as disclosed herein, a user can repeatedly return to any desired portion of even very complicated and/or large documents without resorting to the time consuming search and find processes currently employed, and without breaking their concentration, losing their focus, and/or losing the context.

In addition, as discussed in more detail below, using the below embodiments, with little or no modification and/or user input, there is considerable flexibility, adaptability, and opportunity for customization to meet the specific needs of various users under numerous circumstances.

Figure 1:
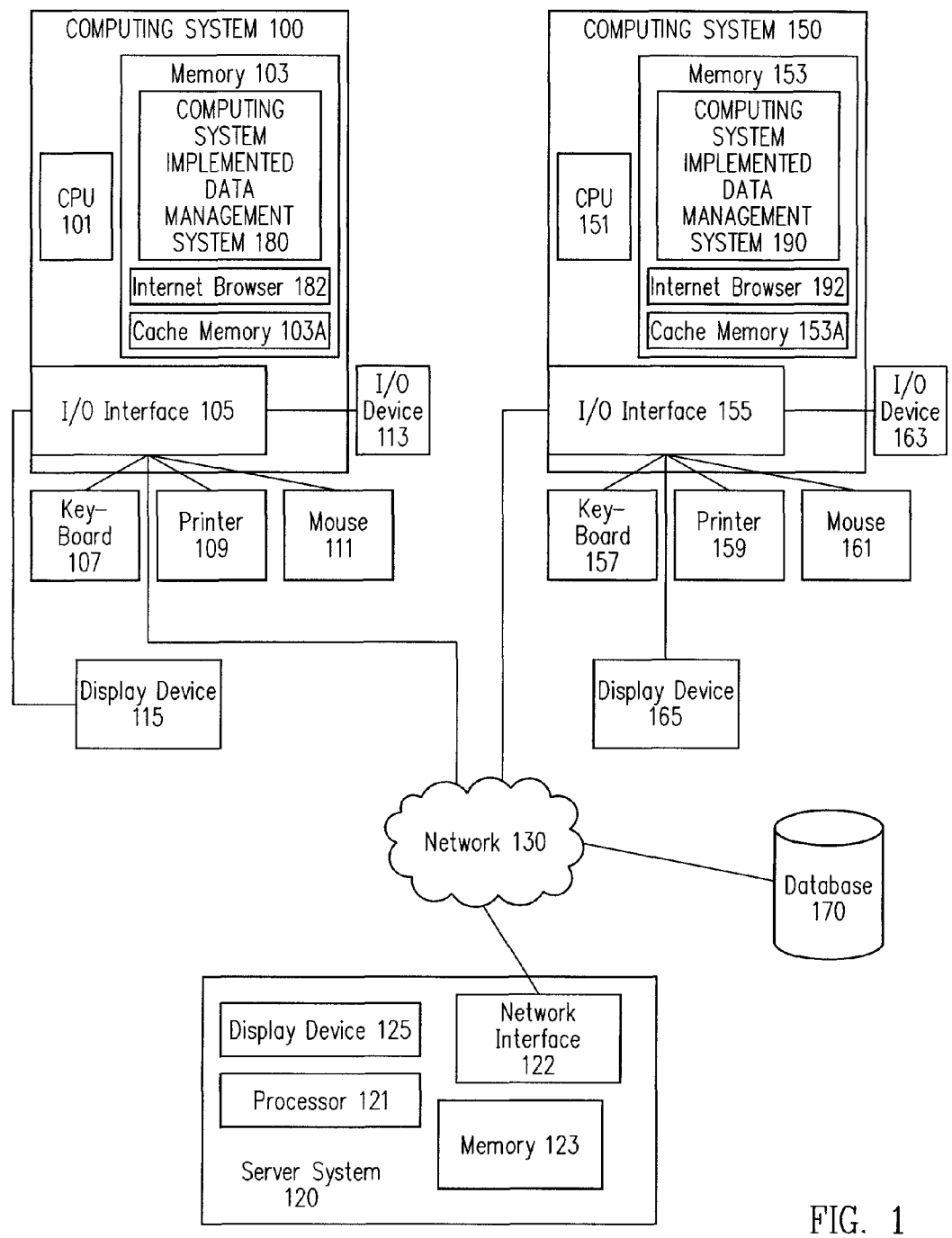
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for providing scroll bar enabled bookmarks in electronic document displays includes a process for providing scroll bar enabled bookmarks in electronic document displays whereby a bookmark enabled scroll bar is provided as a feature associated with a displayed electronic document on a display device and/or a computing system. In one embodiment, the bookmark enabled scroll bar includes one or more bookmark sequencing buttons. In one embodiment, when a reader/reviewer of an electronic document, herein also referred to as a user, desires to mark a portion of an electronic document for future reference, the user places a bookmark/breakpoint in the bookmark enabled scroll bar at a location on the bookmark enabled scroll bar corresponding to the portion of the electronic document the user wishes to bookmark for future reference. In one embodiment, once the user places a bookmark/breakpoint in the bookmark enabled scroll bar at a location on the bookmark enabled scroll bar corresponding to the portion of the electronic document the user wishes to bookmark for future reference, a visual indicator appears in the bookmark enabled scroll bar at the selected location corresponding to the portion of the electronic document the user wishes to bookmark for future reference. In one embodiment, when the user desires to return to the portion of the electronic document the user bookmarked for future reference, the user activates one of the one or more bookmark sequencing buttons and the user is taken to the corresponding portion of the electronic document the user had bookmarked using the bookmark enabled scroll bar.

FIG. 1 is a block diagram of an exemplary hardware architecture for implementing one embodiment of a system and method for providing scroll bar enabled bookmarks in electronic document displays, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented data management system 180 such as any computing system implemented data management system defined herein, known in the art at the time of filing, and/or as developed thereafter. In one embodiment, computing system implemented data management system 180 is any computing system implemented word processing system. In one embodiment, computing system implemented data management system 180 is any computing system implemented document display system. In one embodiment, computing system implemented data management system 180 is any computing system implemented spreadsheet system In one embodiment, computing system implemented data management system 180 is stored, in whole, or in part, in memory system 103, and is used by, or includes, or is accessed by, a process for providing scroll bar enabled bookmarks in electronic document displays (not shown in FIG. 1, see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing scroll bar enabled bookmarks in electronic document displays, and/or a computing system implemented data management system, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, data associated with one of more electronic documents, one or more user selected bookmarks and/or bookmark features, and any other data associated with one or more user selected bookmarks, is stored, in whole, or in part, in memory system 103, and is used by, or is accessed by, a process for providing scroll bar enabled bookmarks in electronic document displays, computing system implemented data management system, and/or one or more users. In one embodiment, computing system 100 is a computing system accessible by one or more users. In one embodiment, computing system 100 is used, and/or accessible, by another computing system, such as computing system 150 (discussed below).

Computing system 100 can be any computing system as defined herein and/or as known in the art at the time of filing and/or as developed thereafter, that includes components that can execute all, or part, of a process for providing scroll bar enabled bookmarks in electronic document displays, and/or a computing system implemented data management system, in accordance with at least one of the embodiments as described herein.

Similarly, computing system 150 typically includes a CPU 150, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented data management system 190 such as any computing system implemented data management system defined herein, known in the art at the time of filing, and/or as developed thereafter. In one embodiment, computing system implemented data management system 190 is any computing system implemented word processing system. In one embodiment, computing system implemented data management system 190 is any computing system implemented document display system. In one embodiment, computing system implemented data management system 190 is any computing system implemented spreadsheet system.

In one embodiment, data associated with one of more electronic documents, one or more user selected bookmarks and/or bookmark features, and any other data associated with one or more user selected bookmarks, is stored, in whole, or in part, in memory system 153, and is used by, or is accessed by, a process for providing scroll bar enabled bookmarks in electronic document displays, computing system implemented data management system, and/or one or more users.

In one embodiment, computing system 150 is a computing system accessible by one or more users. In one embodiment, computing system 150 is used, and/or accessible, by another computing system, such as computing system 100.

Computing system 150 can be any computing system as defined herein and/or as known in the art at the time of filing and/or as developed thereafter, that includes components that can execute all, or part, of a process for providing scroll bar enabled bookmarks in electronic document displays, and/or a computing system implemented data management system, in accordance with at least one of the embodiments as described herein.

As discussed in more detail below, in one embodiment, all, or part, of a process for providing scroll bar enabled bookmarks in electronic document displays, and/or a computing system implemented data management system, and/or data associated with one of more electronic documents, one or more user selected bookmarks and/or bookmark features, and any other data associated with one or more user selected bookmarks, and/or data used to obtain and/or generate any of the displays discussed herein, can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for providing scroll bar enabled bookmarks in electronic document displays, and/or a computing system implemented data management system.

In one embodiment, all, or part, of a process for providing scroll bar enabled bookmarks in electronic document displays, and/or a computing system implemented data management system, and/or data associated with one of more electronic documents, one or more user selected bookmarks and/or bookmark features, and any other data associated with one or more user selected bookmarks, and/or data used to obtain and/or generate any of the displays discussed herein, is stored, in whole, or in part, in database 170, and is used by, or is accessed by, a process for providing scroll bar enabled bookmarks in electronic document displays. In one embodiment, database 170 is accessible by one or more users. In one embodiment, database 170 is used, and/or accessible, by a computing system, such as computing systems 100 and/or 150, and/or a server system, such as sever system 120 (discussed below).

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, all, or part, of a process for providing scroll bar enabled bookmarks in electronic document displays, and/or a computing system implemented data management system, and/or data associated with one of more electronic documents, one or more user selected bookmarks and/or bookmark features, and any other data associated with one or more user selected bookmarks, and/or data used to obtain and/or generate any of the displays discussed herein, is stored, in whole, or in part, in server system 120, and is used by, or is accessed by, a process for providing scroll bar enabled bookmarks in electronic document displays. In one embodiment, server system 120 is accessible by one or more users. In one embodiment, server system 120 is used, and/or accessible, by a computing system, such as computing systems 100 and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, one or more embodiments. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, all, or part, of a process for providing scroll bar enabled bookmarks in electronic document displays, and/or a computing system implemented data management system, and/or data associated with one of more electronic documents, one or more user selected bookmarks and/or bookmark features, and any other data associated with one or more user selected bookmarks, and/or data used to obtain and/or generate any of the displays discussed herein, is stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing scroll bar enabled bookmarks in electronic document displays, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing scroll bar enabled bookmarks in electronic document displays, and/or a computing system implemented data management system, is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 150, or server system processor 121. In one embodiment, execution of a process by CPU 101, CPU 150, or server system processor 121, results in the operations of an agent computer process (not shown) and/or a rule computer process (not shown).

In one embodiment, all, or part, of a process for providing scroll bar enabled bookmarks in electronic document displays, and/or a computing system implemented data management system, and/or data associated with one of more electronic documents, and/or one or more user selected bookmarks and/or bookmark features, and any other data associated with one or more user selected bookmarks, and/or data used to obtain and/or generate any of the displays discussed herein, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "document" and "text" and "word" include, but are not limited to, one or more of the following: any document of any type and displaying data in any format; a trade and/or professional book, or portion thereof; a work of fiction, or portion thereof; a work of non-fiction, or portion thereof; a school textbook, or portion thereof; a work document, or portion thereof; a presentation, or portion thereof; a news article, or portion thereof; a shared work and/or private document, or portion thereof; a legal document, or portion thereof; a ledger, or portion thereof; a spread sheet, or portion thereof; or virtually any document, or portion thereof, containing at least one symbol.

Herein, the terms "electronic document", "electronic document", "digital data representing a document", and "digital document" are used interchangeably and include, but are not limited to, any documents, or portion thereof, and/or text, or portion thereof, and/or word and/or symbol represented in electronic media and/or format, including, but not limited to: digital text, PDF text; bitmap text; or any other representation of one or more words, in any language, that is capable of being displayed on a display device associated with a computing system as discussed herein, and/or known in the art at the time of filing, and/or as developed after the time of filing.

Herein, the term "user", "user/reader", "reader/reviewer", "reviewer", and "reader" are used interchangeably to denote any party that uses and/or interacts with the process for providing scroll bar enabled bookmarks in electronic document displays for any purpose.

As used herein, the term "computing system", includes, but is not limited to: a desk-top computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented word processing systems, packages, programs, modules, or applications; computing system implemented document display systems, packages, programs, modules, or applications; computing system implemented social networking systems, packages, programs, modules, or applications; computing system implemented inventory systems, packages, programs, modules, or applications; computing system implemented online banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filing or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a system and method for providing scroll bar enabled bookmarks in electronic document displays includes a process for providing scroll bar enabled bookmarks in electronic document displays whereby a bookmark enabled scroll bar is provided as a feature associated with a displayed electronic document on a display device and/or a computing system. In one embodiment, the bookmark enabled scroll bar includes one or more bookmark sequencing buttons. In one embodiment, when a reader/reviewer of an electronic document, herein also referred to as a user, desires to mark a portion of an electronic document for future reference, the user places a bookmark/breakpoint in the bookmark enabled scroll bar at a location on the bookmark enabled scroll bar corresponding to the portion of the electronic document the user wishes to bookmark for future reference. In one embodiment, once the user places a bookmark/breakpoint in the bookmark enabled scroll bar at a location on the bookmark enabled scroll bar corresponding to the portion of the electronic document the user wishes to bookmark for future reference, a visual indicator appears in the bookmark enabled scroll bar at the selected location corresponding to the portion of the electronic document the user wishes to bookmark for future reference. In one embodiment, when the user desires to return to the portion of the electronic document the user bookmarked for future reference, the user activates one of the one or more bookmark sequencing buttons and the user is taken to the corresponding portion of the electronic document the user had bookmarked using the bookmark enabled scroll bar.

Figure 2:
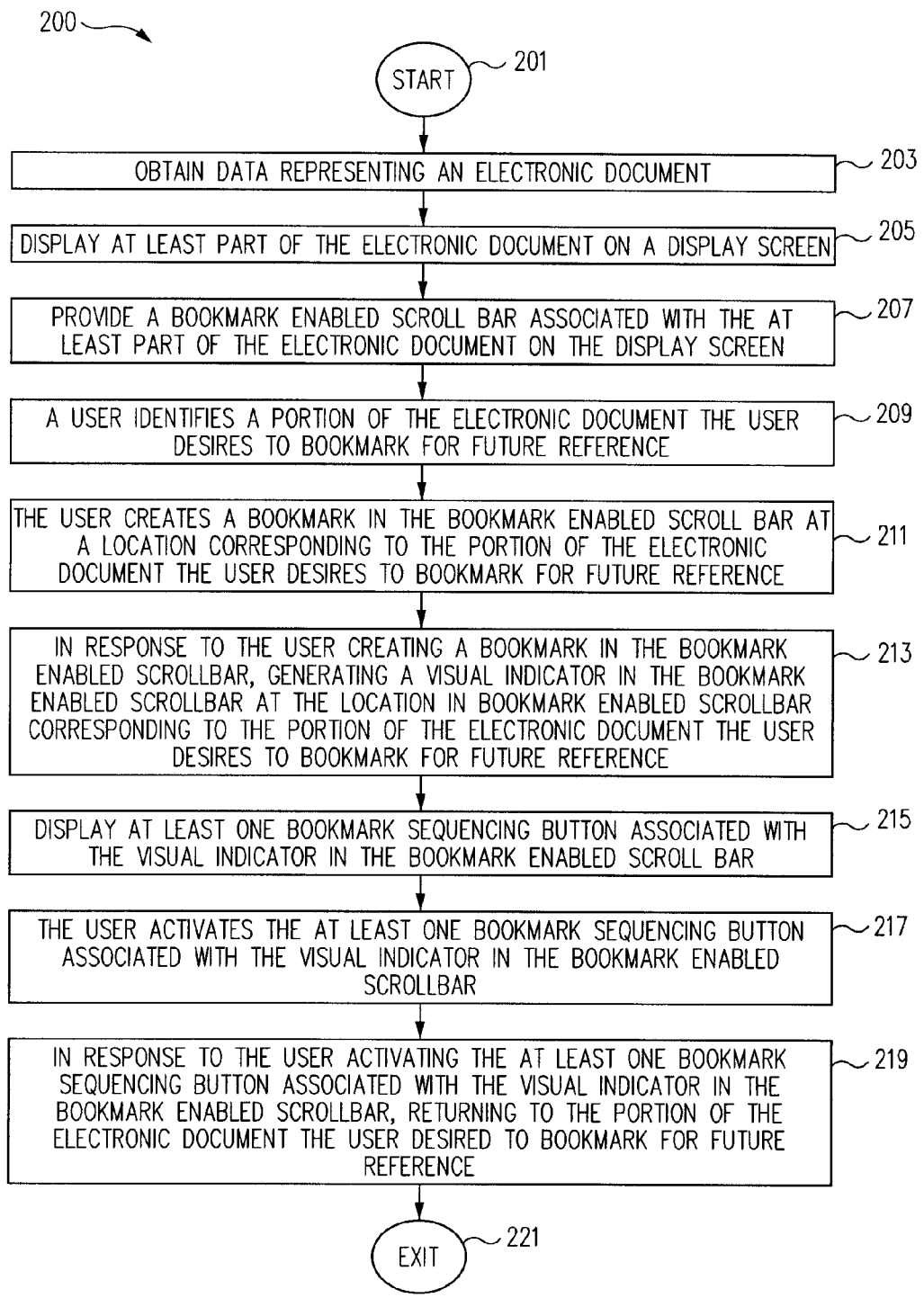
FIG. 2 is a flow chart depicting a process for providing scroll bar enabled bookmarks in electronic document displays in accordance with one embodiment.

FIG. 2 is a flow chart depicting a process for providing scroll bar enabled bookmarks in electronic document displays 200 in accordance with one embodiment. Process for providing scroll bar enabled bookmarks in electronic document displays 200 begins at ENTER OPERATION 201 and process flow proceeds to OBTAIN DATA REPRESENTING AN ELECTRONIC DOCUMENT OPERATION 203.

In one embodiment, at OBTAIN DATA REPRESENTING AN ELECTRONIC DOCUMENT OPERATION 203 an electronic document, or portion of an electronic document, is obtained.

As noted above, herein, the terms "document" and "text" and "word" include, but are not limited to, one or more of the following: any document of any type and displaying data in any format; a trade and/or professional book, or portion thereof; a work of fiction, or portion thereof; a work of non-fiction, or portion thereof; a school textbook, or portion thereof; a work document, or portion thereof; a presentation, or portion thereof; a news article, or portion thereof; a shared work and/or private document, or portion thereof; a legal document, or portion thereof; a ledger, or portion thereof; a spread sheet, or portion thereof; or virtually any document, or portion thereof, containing at least one symbol.

As also noted above, herein, the terms "electronic document", "electronic media based document", "digital data representing a document", and "digital document" include, but are not limited to, any documents, or portion thereof, and/or text, or portion thereof, and/or word, represented in electronic media and/or format, including, but not limited to: digital text, PDF text; bitmap text; or any other representation of one or more words and/or symbols, in any language, that is capable of being displayed on a display device associated with a computing system as discussed herein, and/or known in the art at the time of filing, and/or as developed after the time of filing.

In one embodiment, at OBTAIN DATA REPRESENTING AN ELECTRONIC DOCUMENT OPERATION 203 at least part of the data representing an electronic document is obtained either directly, or through a computing system implemented data management system, such as computing system implemented data management systems 180 and/or 190 of FIG. 1, that implements, includes, is accessible by, and/or is otherwise associated with, process for providing scroll bar enabled bookmarks in electronic document displays 200 (FIG. 2.

In one embodiment, at OBTAIN DATA REPRESENTING AN ELECTRONIC DOCUMENT OPERATION 203 at least part of the data representing an electronic document is obtained by providing process for providing scroll bar enabled bookmarks in electronic document displays 200, and/or a computing system implemented data management system associated with process for providing scroll bar enabled bookmarks in electronic document displays 200, access to the data on a database, such as database 170 of FIG. 1, a computing system, such as computing systems 100 and/or 150 of FIG. 1, and/or a server system, such as server system 120 of FIG. 1, or a web-site or other web-based system, and/or using a computer program product as defined herein.

In one embodiment, at OBTAIN DATA REPRESENTING AN ELECTRONIC DOCUMENT OPERATION 203 at least part of the data representing an electronic document is obtained from the Internet.

Returning to FIG. 2, in one embodiment, at OBTAIN DATA REPRESENTING AN ELECTRONIC DOCUMENT OPERATION 203 at least part of the data representing an electronic document is obtained through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, at OBTAIN DATA REPRESENTING AN ELECTRONIC DOCUMENT OPERATION 203 at least part of the data representing an electronic document is obtained through e-mail or through text messaging.

In one embodiment, at OBTAIN DATA REPRESENTING AN ELECTRONIC DOCUMENT OPERATION 203 at least part of the data representing an electronic document is obtained using screen scraping technology, or any similar technology, as discussed herein, and/or as known in the art at the time of filing, and/or as developed after the time of filing.

In one embodiment, at OBTAIN DATA REPRESENTING AN ELECTRONIC DOCUMENT OPERATION 203 at least part of the data representing an electronic document is obtained via a computer program product as defined herein, discussed herein, and/or known in the art at the time of filing, and/or as developed after the time of filing.

In one embodiment, at OBTAIN DATA REPRESENTING AN ELECTRONIC DOCUMENT OPERATION 203 at least part of the data representing an electronic document is obtained using any method, apparatus, process or mechanism for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, once an electronic document, or portion of an electronic document, is obtained at OBTAIN DATA REPRESENTING AN ELECTRONIC DOCUMENT OPERATION 203, process flow proceeds to DISPLAY AT LEAST PART OF THE ELECTRONIC DOCUMENT ON A DISPLAY SCREEN OPERATION 205.

In one embodiment, at DISPLAY AT LEAST PART OF THE ELECTRONIC DOCUMENT ON A DISPLAY SCREEN OPERATION 205 at least a portion of the electronic document of OBTAIN DATA REPRESENTING AN ELECTRONIC DOCUMENT OPERATION 203 is displayed on a display screen associated with a computing system.

In one embodiment, at DISPLAY AT LEAST PART OF THE ELECTRONIC DOCUMENT ON A DISPLAY SCREEN OPERATION 205 at least a portion of the electronic document of OBTAIN DATA REPRESENTING AN ELECTRONIC DOCUMENT OPERATION 203 is displayed on a display screen of a display device, such as display devices 115, 165 and/or 125 of FIG. 1, associated with a computing system, such as computing systems 100 and 150 of FIG. 1 and/or server system 120 of FIG. 1, and/or any computing system as defined herein, discussed herein, and/or as known in the art at the time of filing, and/or as developed after the time of filing.

As noted above, herein, the term "computing system", includes, but is not limited to: a desk top computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, at DISPLAY AT LEAST PART OF THE ELECTRONIC DOCUMENT ON A DISPLAY SCREEN OPERATION 205 at least a portion of the electronic document of OBTAIN DATA REPRESENTING AN ELECTRONIC DOCUMENT OPERATION 203 is displayed through a computing system data management system, such as a computing system implemented word processing system, package, program, module, or application, and/or a computing system implemented spread sheet system, package, program, module, or application.

In one embodiment, at DISPLAY AT LEAST PART OF THE ELECTRONIC DOCUMENT ON A DISPLAY SCREEN OPERATION 205 at least a portion of the electronic document of OBTAIN DATA REPRESENTING AN ELECTRONIC DOCUMENT OPERATION 203 is displayed through a computing system data management system such as a computing system document display system, package, program, module, or application, for instance, a PDF document display system, package, program, module, or application, or a bitmap document display system, package, program, module, or application.

Returning to FIG. 2, in one embodiment, once at least a portion of the electronic document of OBTAIN DATA REPRESENTING AN ELECTRONIC DOCUMENT OPERATION 203 is displayed on a display screen associated with a computing system at DISPLAY AT LEAST PART OF THE ELECTRONIC DOCUMENT ON A DISPLAY SCREEN OPERATION 205, process flow proceeds to PROVIDE A BOOKMARK ENABLED SCROLL BAR ASSOCIATED WITH THE AT LEAST PART OF THE ELECTRONIC DOCUMENT ON THE DISPLAY SCREEN OPERATION 207.

In one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 a bookmark enabled scroll bar is provided as a feature associated with the displayed electronic document of DISPLAY AT LEAST PART OF THE ELECTRONIC DOCUMENT ON A DISPLAY SCREEN OPERATION 205.

In one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 the bookmark enabled scroll bar is provided as a feature associated with the displayed electronic document of DISPLAY AT LEAST PART OF THE ELECTRONIC DOCUMENT ON A DISPLAY SCREEN OPERATION 205 and is displayed on any display device discussed herein, and/or known in the art at the time of filing, and/or as developed after the time of filing, displaying at least a portion of the electronic document of OBTAIN DATA REPRESENTING AN ELECTRONIC DOCUMENT OPERATION 203 and/or DISPLAY AT LEAST PART OF THE ELECTRONIC DOCUMENT ON A DISPLAY SCREEN OPERATION 205.

In one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 the bookmark enabled scroll bar is provided as a feature associated with a computing system data management system, such as a computing system implemented word processing system, package, program, module, or application, and/or a computing system implemented spread sheet system, package, program, module, or application.

In one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 the bookmark enabled scroll bar is provided as a feature associated with a computing system data management system such as a computing system document display system, package, program, module, or application, for instance, a PDF document display system, package, program, module, or application, or a bitmap document display system, package, program, module, or application.

In one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 the bookmark enabled scroll bar is provided as a feature associated any computing system data management system such as computing system data management systems 180 and/or 190 of FIG. 1, and/or as discussed herein, and/or as known in the art at the time of filing, and/or as developed after the time of filing.

Returning to FIG. 2, in one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 the bookmark enabled scroll bar is provided as an add-on feature associated with a computing system data management system, package, program, module, or application.

In one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 the bookmark enabled scroll bar is provided as an independent system that is then associated with a computing system data management system, package, program, module, or application.

In one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 the bookmark enabled scroll bar is otherwise implemented, accessed by, provided by, and/or otherwise associated with a computing system data management system, package, program, module, or application.

As discussed in more detail below, in one embodiment, the bookmark enabled scroll bar provided at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 includes one or more bookmark sequencing buttons.

As also discussed in more detail below, in one embodiment, the bookmark enabled scroll bar provided at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 includes one or more bookmark sequencing buttons that take the form of "up" and/or "down" arrow buttons that, in one embodiment, are provided in addition to the standard scroll bar "up" and "down" buttons as a second set of "up" and "down" arrows within the scroll bar itself.

Figure 3:
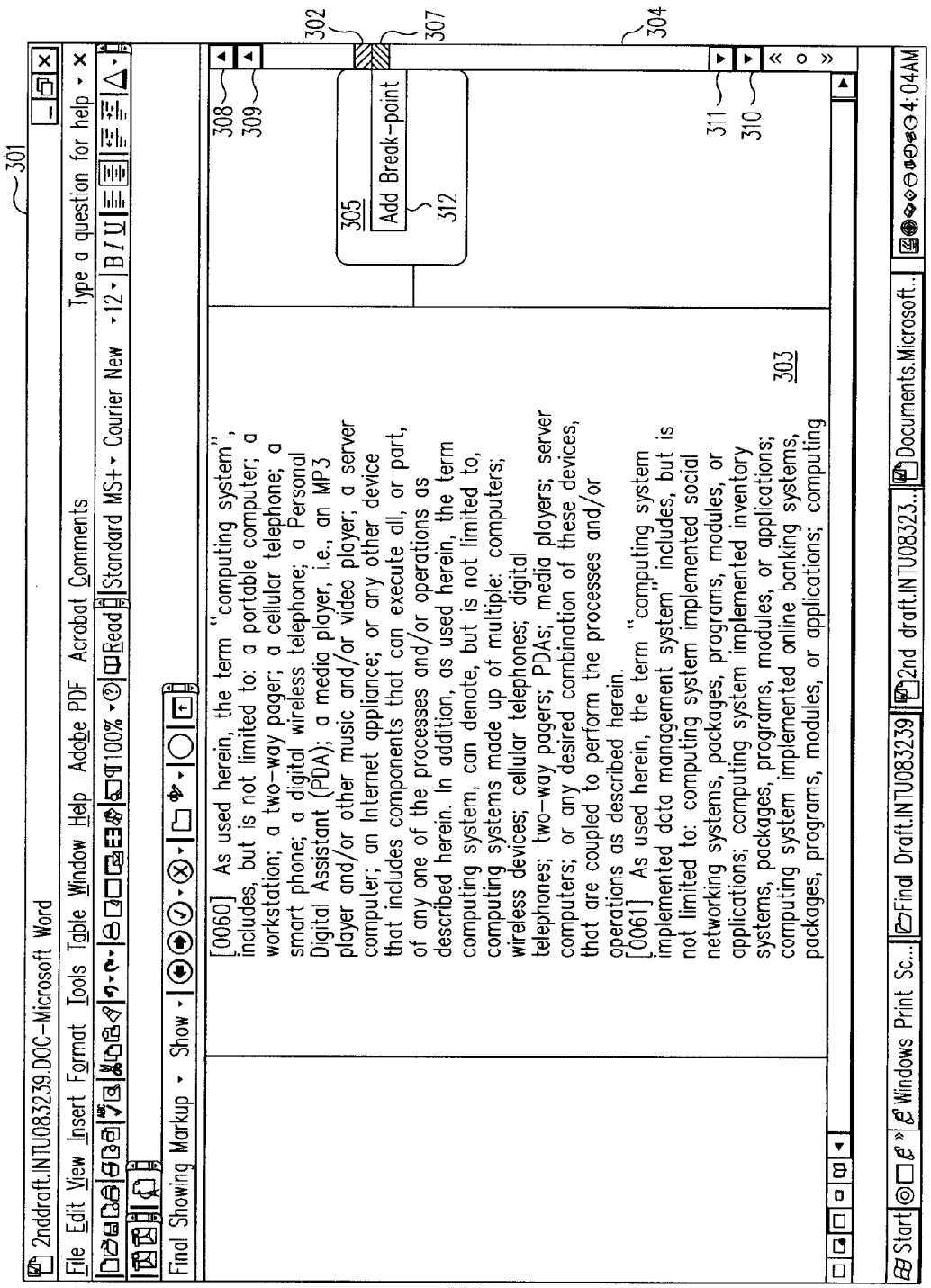
FIG. 3 is a display screen including an electronic document display and a bookmark enabled scroll bar in accordance with one embodiment.

FIG. 3 shows one specific example of an electronic document display including a bookmark enabled scroll bar 301 as would by displayed on a display screen in accordance with one embodiment.

As seen in FIG. 3, electronic document display including a bookmark enabled scroll bar 301 includes, in this specific example, text display 303 that is a portion of an electronic document such as would be obtained, in one embodiment, at OBTAIN DATA REPRESENTING AN ELECTRONIC DOCUMENT OPERATION 203 and is displayed, in one embodiment, at DISPLAY AT LEAST PART OF THE ELECTRONIC DOCUMENT ON A DISPLAY SCREEN OPERATION 205. Returning to FIG. 3, in this specific example, text display 303, is part of a patent application electronic document and includes the definition of a "computing system" as defined in the patent application electronic document.

As also seen in FIG. 3, electronic document display including a bookmark enabled scroll bar 301 includes bookmark enabled scroll bar 304 that is one example of a bookmark enabled scroll bar as would be provided, in one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207.

Returning to FIG. 3, in this specific example, bookmark enabled scroll bar 304 includes basic "up" scroll bar arrow 308 and basic "down" scroll bar arrow 310 and basic position indicator 302. As also seen in FIG. 3, bookmark enabled scroll bar 304 also includes bookmark sequencing buttons; "up" bookmark sequencing button 309 and "down" bookmark sequencing button 311. As discussed in more detail below, "up" bookmark sequencing button 309 and "down" bookmark sequencing button 311 are used to move from any position in an electronic document to the next bookmarked section of the document in the direction indicated by the selected bookmark sequencing button 309 or 311.

Returning to FIG. 3, in this specific example, bookmark enabled scroll bar 304 also includes visual indicator 307 and add bookmark selector display 305. Visual indicator 307 and add bookmark selector display 305 are discussed in more detail below.

Those of skill in the art will readily recognize that the specific display shown in FIG. 3 is exemplary only. In particular, the display screens and user interface elements shown in the FIG. 3 are in accordance with one illustrative example and other layouts, arrangements, formats, and user interface features may be provided without departing from the characteristics of the invention as set forth in the claims.

As discussed in more detail below with respect to FIGS. 4 and 5, in one embodiment, the bookmark enabled scroll bar provided at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 (FIG. 2) includes one or more bookmark sequencing buttons that are color-coded arrows, blocks, or other symbols that, as discussed in more detail below, correspond to color-coded, and/or symbol-coded, and/or number-coded, bookmarks and/or bookmark visual indicators. In some of these embodiments, the color-coded, and/or symbol-coded, and/or number-coded, bookmark visual indicators correspond to specific portions/topics of the electronic document. In some of these embodiments, the color-coded, and/or symbol-coded, and/or number-coded, bookmarks correspond to different users. In some of these embodiments, the color-coded, and/or symbol-coded, and/or number-coded, bookmarks correspond to any coding scheme desired by the user.

In one embodiment, once a bookmark enabled scroll bar is provided at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207, process flow proceeds to A USER IDENTIFIES A PORTION OF THE ELECTRONIC DOCUMENT THE USER DESIRES TO BOOKMARK FOR FUTURE REFERENCE OPERATION 209

In one embodiment at A USER IDENTIFIES A PORTION OF THE ELECTRONIC DOCUMENT THE USER DESIRES TO BOOKMARK FOR FUTURE REFERENCE OPERATION 209, a user identifies a portion, section, symbol, text, or any other sub-section of the electronic document of OBTAIN DATA REPRESENTING AN ELECTRONIC DOCUMENT OPERATION 203 that the user wishes to bookmark for future reference.

Referring again to FIG. 3, as noted above, in the specific example shown in FIG. 3, electronic document display including a bookmark enabled scroll bar 301 includes, text display 303 that is a portion of an electronic document such as would be obtained, in one embodiment, at OBTAIN DATA REPRESENTING AN ELECTRONIC DOCUMENT OPERATION 203 (FIG. 2) and is displayed, in one embodiment, at DISPLAY AT LEAST PART OF THE ELECTRONIC DOCUMENT ON A DISPLAY SCREEN OPERATION 205. As also noted above, in this specific example, text display 303 (FIG. 3), is part of a patent application electronic document and includes the definition of a "computing system" as defined in the patent application electronic document.

In this specific example, it is quite likely a reader of the patent application, such as a Patent Examiner, or a reader of the eventual patent, may desire to return to this definition of a computing system to determine the scope of the invention and/or the scope of the claims (typically presented later in the patent application electronic document). Therefore, in this specific example, it is stipulated that the user in this instance desired to bookmark text display 303 at A USER IDENTIFIES A PORTION OF THE ELECTRONIC DOCUMENT THE USER DESIRES TO BOOKMARK FOR FUTURE REFERENCE OPERATION 209 (FIG. 2).

In one embodiment, once the user identifies a portion, section, symbol, text, or any other subsection of the electronic document of OBTAIN DATA REPRESENTING AN ELECTRONIC DOCUMENT OPERATION 203 that the user wishes to bookmark for future reference at A USER IDEN- TIFIES A PORTION OF THE ELECTRONIC DOCUMENT THE USER DESIRES TO BOOKMARK FOR FUTURE REFERENCE OPERATION 209, process flow proceeds to THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211.

In one embodiment, at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 when the user desires to mark the portion of the electronic document of A USER IDENTIFIES A PORTION OF THE ELECTRONIC DOCUMENT THE USER DESIRES TO BOOKMARK FOR FUTURE REFERENCE OPERATION 209 for future reference, the user activates the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 and places/creates a bookmark/breakpoint at a location in the bookmark enabled scroll bar corresponding to the portion of the electronic document the user wishes to bookmark for future reference of A USER IDENTIFIES A PORTION OF THE ELECTRONIC DOCUMENT THE USER DESIRES TO BOOKMARK FOR FUTURE REFERENCE OPERATION 209.

In one embodiment, at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 the user activates the bookmark enabled scroll bar and places/creates a bookmark/breakpoint at a location in the bookmark enabled scroll bar corresponding to the portion of the electronic document the user wishes to bookmark for future reference via a user interface device, such keyboards 107 and 157 of FIG. 1, mice 111 and 161 of FIG. 1 and I/O devices 113 and 163 of FIG. 1, and/or as defined herein, and/or using any other device and/or system for converting one or more user actions into computing system based instructions as discussed herein, and/or as known in the art at the time of filing, and/or as developed after the time of filing.

For instance, returning to FIG. 2, in one embodiment, at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 the user activates the bookmark enabled scroll bar and places/creates a bookmark/breakpoint at a location in the bookmark enabled scroll bar corresponding to the portion of the electronic document the user wishes to bookmark for future reference using a user interface device, such as a mouse, keyboard, touch screen, or touch pad, to move a cursor over the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 at the location corresponding to the portion of the electronic document desired to be bookmarked of A USER IDENTIFIES A PORTION OF THE ELECTRONIC DOCUMENT THE USER DESIRES TO BOOKMARK FOR FUTURE REFERENCE OPERATION 209.

In one embodiment, at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 the user activates the bookmark enabled scroll bar and places/creates a bookmark/breakpoint at a location in the bookmark enabled scroll bar corresponding to the portion of the electronic document the user wishes to bookmark for future reference using a user interface device, such as a mouse, keyboard, touch screen, or touch pad, to move a cursor over the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 at the location corresponding to the portion of the electronic document desired to be bookmarked of A USER IDENTIFIES A PORTION OF THE ELECTRONIC DOCUMENT THE USER DESIRES TO BOOKMARK FOR FUTURE REFERENCE OPERATION 209 and clicking on the desired enabled scroll bar location.

In one embodiment, at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 the user activates the bookmark enabled scroll bar and places/creates a bookmark/breakpoint at a location in the bookmark enabled scroll bar corresponding the user wishes to bookmark for future reference using a user interface device, such as a mouse, keyboard, touch screen, or touch pad, to move a cursor over the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 at the location corresponding to the portion of the electronic document desired to be bookmarked of A USER IDENTIFIES A PORTION OF THE ELECTRONIC DOCUMENT THE USER DESIRES TO BOOKMARK FOR FUTURE REFERENCE OPERATION 209 and hovering over the desired location in the bookmark enabled scroll bar.

In one embodiment, at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 the user activates the bookmark enabled scroll bar and places/creates a bookmark/breakpoint at a location in the bookmark enabled scroll bar corresponding to the portion of the electronic document the user wishes to bookmark for future reference using a user interface device, such as a mouse, keyboard, touch screen, or touch pad, to move a cursor over the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 at the location corresponding to the portion of the electronic document desired to be bookmarked of A USER IDENTIFIES A PORTION OF THE ELECTRONIC DOCUMENT THE USER DESIRES TO BOOKMARK FOR FUTURE REFERENCE OPERATION 209 and, in one embodiment, the cursor is activated to cause a pop-up bookmark selector display to appear. In one embodiment, through the pop-up bookmark selector display the user can activate the bookmark enabled scroll bar at the location corresponding to the portion of the electronic document desired to be bookmarked by clicking on an add bookmark or add breakpoint selection option and/or button.

In one embodiment, at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 the user activates the bookmark enabled scroll bar and places/creates a bookmark/breakpoint at a location in the bookmark enabled scroll bar corresponding to the portion of the electronic document the user wishes to bookmark for future reference using a user interface device, such as a mouse, keyboard, touch screen, or touch pad, to move a cursor over the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 at the location corresponding to the portion of the electronic document desired to be bookmarked of A USER IDENTIFIES A PORTION OF THE ELECTRONIC DOCUMENT THE USER DESIRES TO BOOKMARK FOR FUTURE REFERENCE OPERATION 209 and, in one embodiment, the cursor acts as a "tool tip" to cause a bookmark selector display to appear. In one embodiment, through the tool tip the user can activate the bookmark enabled scroll bar at the location corresponding to the portion of the electronic document desired to be bookmarked by clicking on an add bookmark or add breakpoint selection option and/or button.

Returning to FIG. 3, in the specific example of FIG. 3, bookmark enabled scroll bar includes add bookmark selector display 305 that, in one embodiment, appears IN RESPONSE TO THE USER CREATING A BOOKMARK IN THE BOOKMARK ENABLED SCROLL BAR and placing/creating a bookmark/breakpoint at a location in the bookmark enabled scroll bar corresponding to the portion of the electronic document the user wishes to bookmark for future reference using a user interface device, such as a mouse, keyboard, touch screen, or touch pad, to move a cursor over bookmark enabled scroll bar 304 at a location corresponding to the portion of the electronic document desired to be bookmarked, in this instance the definition of "computing system" displayed in text display 303. In one embodiment, the user can add a bookmark, and a corresponding visual marker 307, for text display 303 by clicking, or otherwise activating, "Add Break-point" button 312.

Returning to FIG. 2, in one embodiment, at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 the user activates the bookmark enabled scroll bar and places/creates a bookmark/breakpoint at a location in the bookmark enabled scroll bar corresponding to the portion of the electronic document the user wishes to bookmark for future reference using a user interface device, such as a mouse, keyboard, touch screen, or touch pad, to move a cursor over the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 at the location corresponding to the portion of the electronic document desired to be bookmarked of A USER IDENTIFIES A PORTION OF THE ELECTRONIC DOCUMENT THE USER DESIRES TO BOOKMARK FOR FUTURE REFERENCE OPERATION 209 and, in one embodiment, the cursor causes a pop-up display, or acts as a "tool tip", to cause selectable features, such as a color code, symbol code, or number code, associated with the eventual bookmark visual marker to be displayed and/or made user selectable.

Figure 4:
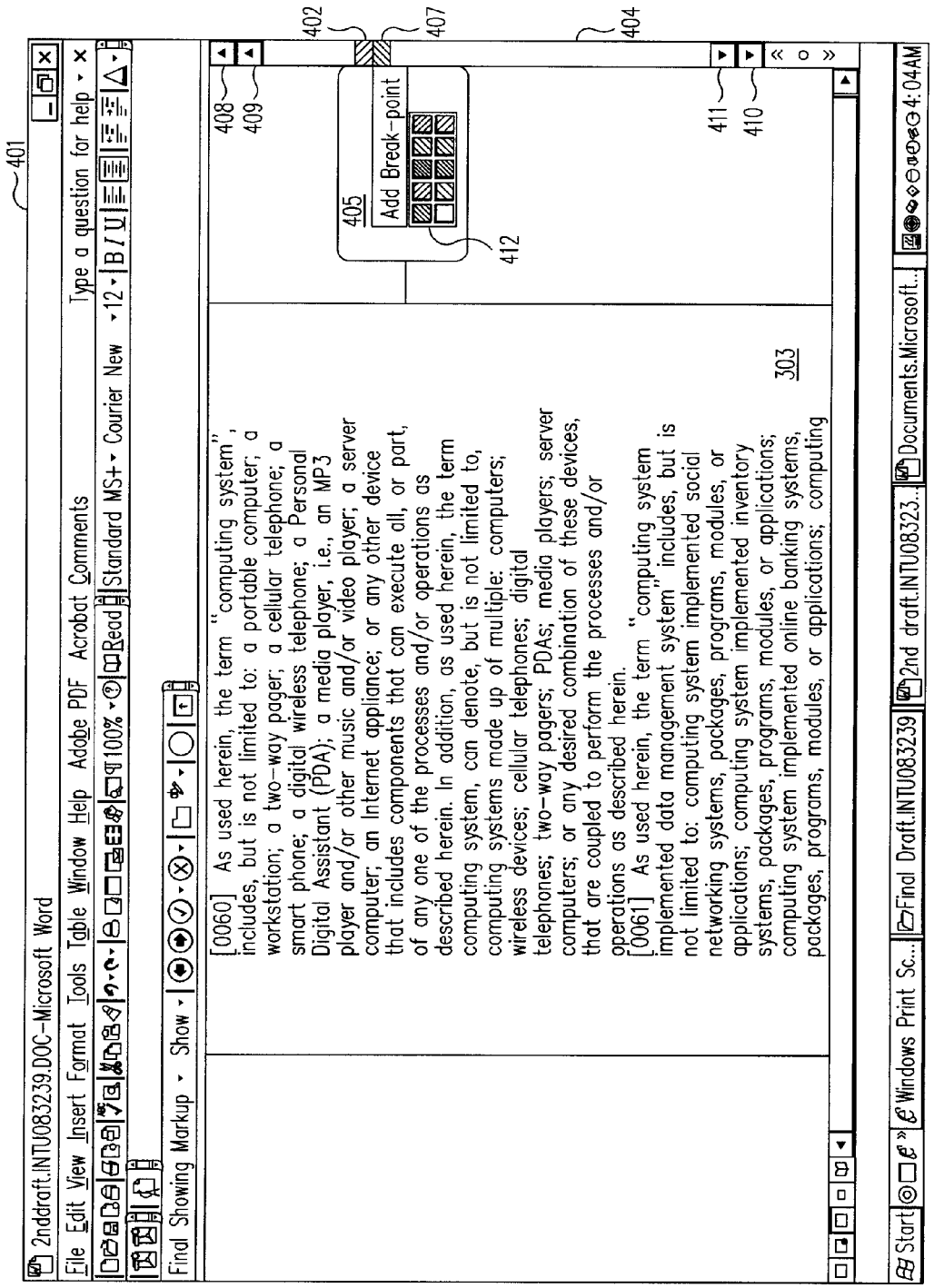
FIG. 4 is a display screen including an electronic document display and a bookmark enabled scroll bar in accordance with one embodiment.

FIG. 4 shows one specific example of an electronic document display including a bookmark enabled scroll bar 401 as would by displayed on a display screen in accordance with one embodiment.

As seen in FIG. 4, electronic document display including a bookmark enabled scroll bar 401 is substantially similar to electronic document display including a bookmark enabled scroll bar 301 of FIG. 3 and, like FIG. 3 includes, in this specific example, text display 303 that is a portion of an electronic document such as would be obtained, in one embodiment, at OBTAIN DATA REPRESENTING AN ELECTRONIC DOCUMENT OPERATION 203 and is displayed, in one embodiment, at DISPLAY AT LEAST PART OF THE ELECTRONIC DOCUMENT ON A DISPLAY SCREEN OPERATION 205. Returning to FIG. 4, as discussed above, in this specific example, text display 303, is part of a patent application electronic document and includes the definition of a "computing system" as defined in the patent application electronic document.

As also seen in FIG. 4, electronic document display including a bookmark enabled scroll bar 301 includes bookmark enabled scroll bar 404 that is one example of a bookmark enabled scroll bar as would be provided, in one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207.

Returning to FIG. 4, in this specific example, bookmark enabled scroll bar 404 includes basic "up" scroll bar arrow 408 and basic "down" scroll bar arrow 410 and basic position indicator 402. As also seen in FIG. 4, bookmark enabled scroll bar 404 also includes bookmark color-coded sequencing buttons; "up" color-coded bookmark sequencing button 409 and "down" color-coded bookmark sequencing button 411. Also seen in FIG. 4 is color-coded visual indicator 407 and color-coded bookmark selector display 405.

In this specific example, "up" color-coded bookmark sequencing button 409, "down" color-coded bookmark sequencing button 411, and color-coded visual indicator 407 are of the same color as selected by the user using color-coded bookmark selector display 405. In this specific example, bookmark enabled scroll bar 404 includes color-coded bookmark selector display 405 that, in one embodiment, appears in response to the user activating bookmark enabled scroll bar 404 at a location corresponding to the portion of the electronic document the user wishes to bookmark for future reference using a user interface device, such as a mouse, keyboard, touch screen, or touch pad, to move a cursor over bookmark enabled scroll bar 404 at a location corresponding to the portion of the electronic document desired to be bookmarked, in this instance the definition of "computing system" displayed in text display 303. In one embodiment, the user can add a bookmark, and select a color for the bookmark, "up" color-coded bookmark sequencing button 409, "down" color-coded bookmark sequencing button 411, and color-coded visual indicator 407, for text display 303 by clicking, or otherwise activating, any of the colors displayed in the color selection pallet 412 of color-coded bookmark selector display 405.

As discussed in more detail below, "up" color-coded bookmark sequencing button 409 and "down" color-coded bookmark sequencing button 411 are used to move from any position in an electronic document to the next bookmarked section of the document in the direction indicated by the selected color-coded bookmark sequencing button 409 or 411 and the being of the selected color of color selection pallet 412 of color-coded bookmark selector display 405.

Those of skill in the art will readily recognize that the specific display shown in FIG. 4 is exemplary only. In particular, the display screens and user interface elements shown in the FIG. 4 are in accordance with one illustrative example and that other layouts, arrangements, formats, and user interface features may be provided without departing from the characteristics of the invention as set forth in the claims.

Returning to FIG. 2, other examples of actions a given user could take to activate the bookmark enabled scroll bar at a location corresponding to the portion of the electronic document desired to be bookmarked at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 include, but are not limited to: voice commands; pressing a menu and/or function key on a remote control device; accessing a channel and/or link associated with the electronic document; or any other action/inaction on the part of the given user whereby the bookmark enabled scroll bar is activated and a location corresponding to the portion of the electronic document desired to be bookmarked is selected and/or identified, as discussed herein, known/available in the art at the time of filing, or as developed after the time of filing.

In one embodiment, once the user activates the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 and places/creates a bookmark/breakpoint at a location in the bookmark enabled scroll bar corresponding to the portion of the electronic document the user wishes to bookmark for future reference of A USER IDENTIFIES A PORTION OF THE ELECTRONIC DOCUMENT THE USER DESIRES TO BOOKMARK FOR FUTURE REFERENCE OPERATION 209 at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211, data indicating the location in the bookmark enabled scroll bar activated, and/or the corresponding portion of the electronic document selected, and/or the type of bookmark selected, and/or selected features associated with the bookmark selected, is stored in a data storage device such as any main memory or mass memory associated with a computing system, in any server system, in any database, or on/in computer readable medium, and/or any other computer program product, as defined herein. In one embodiment, the data, in whole, or in part, is stored on a webpage or in a web-based system, or any other data storage system, or by any other data storage method, discussed herein, and/or known in the art at the time of filing, and/or as developed after the time of filing.

In one embodiment, once the user activates the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 and places/creates a bookmark/breakpoint at a location in the bookmark enabled scroll bar corresponding to the portion of the electronic document the user wishes to bookmark for future reference of A USER IDENTIFIES A PORTION OF THE ELECTRONIC DOCUMENT THE USER DESIRES TO BOOKMARK FOR FUTURE REFERENCE OPERATION 209 at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211, process flow proceeds to IN RESPONSE TO THE USER CREATING A BOOKMARK IN THE BOOKMARK ENABLED SCROLL BAR, GENERATING A VISUAL INDICATOR IN THE BOOKMARK ENABLED SCROLL BAR AT THE LOCATION IN BOOKMARK ENABLED SCROLL BAR CORRESPONDING TO THE PORTION OF THE ELECTRONIC DOCUMENT THE USER DESIRES TO BOOKMARK FOR FUTURE REFERENCE OPERATION 213.

In one embodiment, at IN RESPONSE TO THE USER CREATING A BOOKMARK IN THE BOOKMARK ENABLED SCROLL BAR, GENERATING A VISUAL INDICATOR IN THE BOOKMARK ENABLED SCROLL BAR AT THE LOCATION IN BOOKMARK ENABLED SCROLL BAR CORRESPONDING TO THE PORTION OF THE ELECTRONIC DOCUMENT THE USER DESIRES TO BOOKMARK FOR FUTURE REFERENCE OPERATION 213 a visual indicator is generated and displayed in the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 at the selected location of THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 corresponding to the portion of the electronic document the user wishes to bookmark for future reference of A USER IDENTIFIES A PORTION OF THE ELECTRONIC DOCUMENT THE USER DESIRES TO BOOKMARK FOR FUTURE REFERENCE OPERATION 209.

In various embodiments, the visual indicator generated and displayed in the bookmark enabled scroll bar at IN RESPONSE TO THE USER CREATING A BOOKMARK IN THE BOOKMARK ENABLED SCROLL BAR, GENERATING A VISUAL INDICATOR IN THE BOOKMARK ENABLED SCROLL BAR AT THE LOCATION IN BOOKMARK ENABLED SCROLL BAR CORRESPONDING TO THE PORTION OF THE ELECTRONIC DOCUMENT THE USER DESIRES TO BOOKMARK FOR FUTURE REFERENCE OPERATION 213 is any visual indicator including, but not limited to: a color-coded or non-color-coded line of no color, or of any color, and having any geometric orientation; a color-coded or non-color-coded two dimensional figure or symbol of no color, or any color, and having any geometric orientation; a color-coded or non-color-coded dot, or circle, of no color, or any color; a color-coded or non-color-coded number symbol of no color, or of any color, and having any geometric orientation; a color-coded or non-color-coded letter of no color, or of any color, and having any geometric orientation; or any other color-coded or non-color-coded visual indicator and/or symbol of no color, or of any color, and having any geometric orientation desired.

Returning to FIG. 3, electronic document display including a bookmark enabled scroll bar 301 includes bookmark enabled scroll bar 304 that is one example of a bookmark enabled scroll bar as would be provided, in one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207.

Returning to FIG. 3, in this specific example, bookmark enabled scroll bar 304 includes visual indicator 307 that is one example of a visual indicator such as would be generated and displayed at IN RESPONSE TO THE USER CREATING A BOOKMARK IN THE BOOKMARK ENABLED SCROLL BAR, GENERATING A VISUAL INDICATOR IN THE BOOKMARK ENABLED SCROLL BAR AT THE LOCATION IN BOOKMARK ENABLED SCROLL BAR CORRESPONDING TO THE PORTION OF THE ELECTRONIC DOCUMENT THE USER DESIRES TO BOOKMARK FOR FUTURE REFERENCE OPERATION 213 (FIG. 2). Returning to FIG. 3, in the specific example of FIG. 3 visual indicator 307 is a non-color-coded rectangle in the color grey.

Referring now to FIG. 4, as discussed above, bookmark enabled scroll bar 404 includes color-coded visual indicator 407 and color-coded bookmark selector display 405. Color-coded visual indicator 407 is one example of a visual indicator as would be generated and displayed at IN RESPONSE TO THE USER CREATING A BOOKMARK IN THE BOOKMARK ENABLED SCROLL BAR, GENERATING A VISUAL INDICATOR IN THE BOOKMARK ENABLED SCROLL BAR AT THE LOCATION IN BOOKMARK ENABLED SCROLL BAR CORRESPONDING TO THE PORTION OF THE ELECTRONIC DOCUMENT THE USER DESIRES TO BOOKMARK FOR FUTURE REFERENCE OPERATION 213 (FIG. 2).

In this specific example, color-coded visual indicator 407 is of the color black as selected by the user using color-coded bookmark selector display 405.

Returning to FIG. 2, once a visual indicator is generated and displayed in the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 at the selected location of THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 corresponding to the portion of the electronic document the user wishes to bookmark for future reference of A USER IDENTIFIES A PORTION OF THE ELECTRONIC DOCUMENT THE USER DESIRES TO BOOKMARK FOR FUTURE REFERENCE OPERATION 209 at IN RESPONSE TO THE USER CREATING A BOOKMARK IN THE BOOKMARK ENABLED SCROLL BAR, GENERATING A VISUAL INDICATOR IN THE BOOKMARK ENABLED SCROLL BAR AT THE LOCATION IN BOOKMARK ENABLED SCROLL BAR CORRESPONDING TO THE PORTION OF THE ELECTRONIC DOCUMENT THE USER DESIRES TO BOOKMARK FOR FUTURE REFERENCE OPERATION 213, process flow proceeds to DISPLAY AT LEAST ONE BOOKMARK SEQUENCING BUTTON ASSOCIATED WITH THE VISUAL INDICATOR IN THE BOOKMARK ENABLED SCROLL BAR OPERATION 215.

In one embodiment, at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 at least one bookmark sequencing button is displayed.

In one embodiment, at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 the at least one bookmark sequencing button is automatically displayed as part of the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 with, or without, the user activating the bookmark enabled scroll bar and creating a bookmark at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211.

In one embodiment, at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 the at least one bookmark sequencing button is displayed only in response to the user creating a bookmark at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211.

In one embodiment, at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 the at least one bookmark sequencing button is displayed only once a visual indicator is displayed at IN RESPONSE TO THE USER CREATING A BOOKMARK IN THE BOOKMARK ENABLED SCROLL BAR, GENERATING A VISUAL INDICATOR IN THE BOOKMARK ENABLED SCROLL BAR AT THE LOCATION IN BOOKMARK ENABLED SCROLL BAR CORRESPONDING TO THE PORTION OF THE ELECTRONIC DOCUMENT THE USER DESIRES TO BOOKMARK FOR FUTURE REFERENCE OPERATION 213.

As discussed above, in one embodiment, the at least one bookmark sequencing button displayed at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 takes the form of "up" and/or "down" arrow buttons that, in one embodiment, are provided in addition to the standard scroll bar "up" and "down" buttons as a second set of "up" and "down" arrows within the scroll bar itself.

Returning to FIG. 3, in this specific example, bookmark enabled scroll bar 304 includes basic "up" scroll bar arrow 308 and basic "down" scroll bar arrow 310 and basic position indicator 302. As also seen in FIG. 3, bookmark enabled scroll bar 304 also includes bookmark sequencing buttons; "up" bookmark sequencing button 309 and "down" bookmark sequencing button 311.

In one embodiment, "up" bookmark sequencing button 309 and "down" bookmark sequencing button 311 are used to move from any position in an electronic document to the next bookmarked section of the document in the direction indicated by the selected bookmark sequencing button 309 or 311, i.e., activating "up" bookmark sequencing button 309 causes the display to move to the portion of the electronic document corresponding to the next bookmark and/or visual indicator in the "up", or preceding/backward, direction and activating "down" bookmark sequencing button 311 causes the display to move to the portion of the electronic document corresponding to the next bookmark and/or visual indicator in the "down", or forward, direction.

Returning to FIG. 2, as also discussed above, in one embodiment, the at least one bookmark sequencing button displayed at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 can be color-coded, symbol-coded, and/or number-coded, bookmarks arrows, blocks, or other symbols that, as discussed in more detail below, correspond to color-coded, and/or symbol-coded, and/or number-coded bookmarks and/or bookmark visual indicators. In some of these embodiments, the color-coded, and/or symbol-coded, and/or number-coded, bookmark sequencing buttons correspond to specific portions/topics of the electronic document. In some of these embodiments, the color-coded, and/or symbol-coded, and/or number-coded, bookmarks correspond to different users and a user can filter out all bookmarks associated with other users in order to view only that user's bookmarks, or a given user's bookmarks. In some of these embodiments, the color-coded, and/or symbol-coded, and/or number-coded, bookmarks correspond to any coding scheme desired by the user.

Referring to FIG. 4, bookmark enabled scroll bar 404 includes basic "up" scroll bar arrow 408 and basic "down" scroll bar arrow 410 and basic position indicator 402. As also seen in FIG. 4, bookmark enabled scroll bar 404 also includes bookmark color-coded sequencing buttons; "up" color-coded bookmark sequencing button 409 and "down" color-coded bookmark sequencing button 411. Also seen in FIG. 4 is color-coded visual indicator 407 and color-coded bookmark selector display 405.

In this specific example, "up" color-coded bookmark sequencing button 409, "down" color-coded bookmark sequencing button 411, and color-coded visual indicator 407 are of the same color, in one embodiment, as selected by the user using color-coded bookmark selector display 405. In this specific example, bookmark enabled scroll bar 404 includes color-coded bookmark selector display 405 that, in one embodiment, appears in response to the user activating bookmark enabled scroll bar 404 and creating a bookmark at a location corresponding to the portion of the electronic document the user wishes to bookmark for future reference using a user interface device, such as a mouse, keyboard, touch screen, or touch pad, to move a cursor over bookmark enabled scroll bar 404 at a location corresponding to the portion of the electronic document desired to be bookmarked, in this instance the definition of "computing system" displayed in text display 303. In one embodiment, the user can add a bookmark, and select a color for the bookmark, "up" color-coded bookmark sequencing button 409, "down" color-coded bookmark sequencing button 411, and color-coded visual indicator 407, for text display 303 by clicking, or otherwise activating, any of the colors displayed in the color selection pallet 412 of color-coded bookmark selector display 405.

In one embodiment "up" color-coded bookmark sequencing button 409 and "down" color-coded bookmark sequencing button 411 are used to move from any position in an electronic document to the next bookmarked section of the document in the direction indicated by the selected color-coded bookmark sequencing button 409 or 411 and the being of the selected color of color selection pallet 412 of color-coded bookmark selector display 405.

For example, assume that in this specific example, "up" color-coded bookmark sequencing button 409, "down" color-coded bookmark sequencing button 411 and color-coded visual indicator 407 are color-coded as black. Then, in this specific example, activating "up" color-coded bookmark sequencing button 409 causes the display to move to the portion of the electronic document corresponding to the next black bookmark and/or visual indicator in the "up", or preceding/backward, direction while skipping any intervening bookmarks and/or visual indicators of any color other than black. Likewise, in this specific example, activating "down" bookmark sequencing button 411 causes the display to move to the portion of the electronic document corresponding to the next black bookmark and/or visual indicator in the "down", or forward, direction while skipping any intervening bookmarks and/or visual indicators of any color other than black.

Returning to FIG. 2, in one embodiment, the at least one bookmark sequencing button displayed at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 takes the form of any symbol. For instance, in various embodiments, the at least one bookmark sequencing button displayed at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 can be, but is not limited to, any one or more of the following: a color-coded or non-color-coded line of no color, or of any color, and having any geometric orientation; a color-coded or non-color-coded two dimensional figure or symbol of no color, or any color, and having any geometric orientation; a color-coded or non-color-coded dot, or circle, of no color, or any color; a color-coded or non-color-coded number symbol of no color, or of any color, and having any geometric orientation; a color-coded or non-color-coded letter of no color, or of any color, and having any geometric orientation; or any other color-coded or non-color-coded visual indicator and/or symbol of no color, or of any color, and having any geometric orientation desired.

In some embodiments, the at least one bookmark sequencing button displayed at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 is coded by symbols or numbers, rather than colors, that correspond to symbol-coded, and/or number-coded, bookmark visual indicators.

As discussed in more detail below, in one embodiment, a user can select a color-coded, symbol-coded, and/or number-coded bookmark sequencing button of a specific color, symbol, or number via a bookmark sequencing button selection display. In one embodiment, the cursor acts as a pop-up display or "tool tip" to cause selectable features, such as a color code, symbol code, or number code, of the desired bookmark sequencing button to be displayed and/or made user selectable.

In one embodiment, once at least one bookmark sequencing button is displayed at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215, process flow proceeds to THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217.

In one embodiment, at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 when the user desires to return to the portion of the electronic document the user bookmarked for future reference at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211, the user activates one of the one or more bookmark sequencing buttons of DISPLAY AT LEAST ONE BOOKMARK SEQUENCING BUTTON ASSOCIATED WITH THE VISUAL INDICATOR IN THE BOOKMARK ENABLED SCROLL BAR OPERATION 215.

In one embodiment, at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 the user activates one of the bookmark sequencing buttons via a user interface device, such keyboards 107 and 157 of FIG. 1, mice 111 and 161 of FIG. 1 and I/O devices 113 and 163 of FIG. 1, and/or as defined herein, and/or using any other device and/or system for converting one or more user actions into computing system based instructions as discussed herein, and/or as known in the art at the time of filing, and/or as developed after the time of filing.

For instance, returning to FIG. 2, In one embodiment, at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 the user activates one of the bookmark sequencing buttons using a user interface device, such as a mouse, keyboard, touch screen, or touch pad, to move a cursor over the desired bookmark sequencing button.

In one embodiment, at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 the user activates one of the bookmark sequencing buttons using a user interface device, such as a mouse, keyboard, touch screen, or touch pad, to move a cursor over the desired bookmark sequencing button and clicking on the desired bookmark sequencing button.

In one embodiment, at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 the user activates one of the bookmark sequencing buttons using a user interface device, such as a mouse, keyboard, touch screen, or touch pad, to move a cursor over the desired bookmark sequencing button and hovering over the desired bookmark sequencing button.

In one embodiment, at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 the user activates one of the bookmark sequencing buttons using a user interface device, such as a mouse, keyboard, touch screen, or touch pad, to move a cursor over the desired bookmark sequencing button and, in one embodiment, the cursor acts as a "tool tip" to cause a bookmark sequencing button selection display to appear. In some of these embodiments, the bookmark sequencing button selection display displays selectable features, such as a color code, symbol code, or number code, associated with various color-coded, symbol-coded, or number-coded bookmarks and/or bookmark visual markers.

Figure 5:
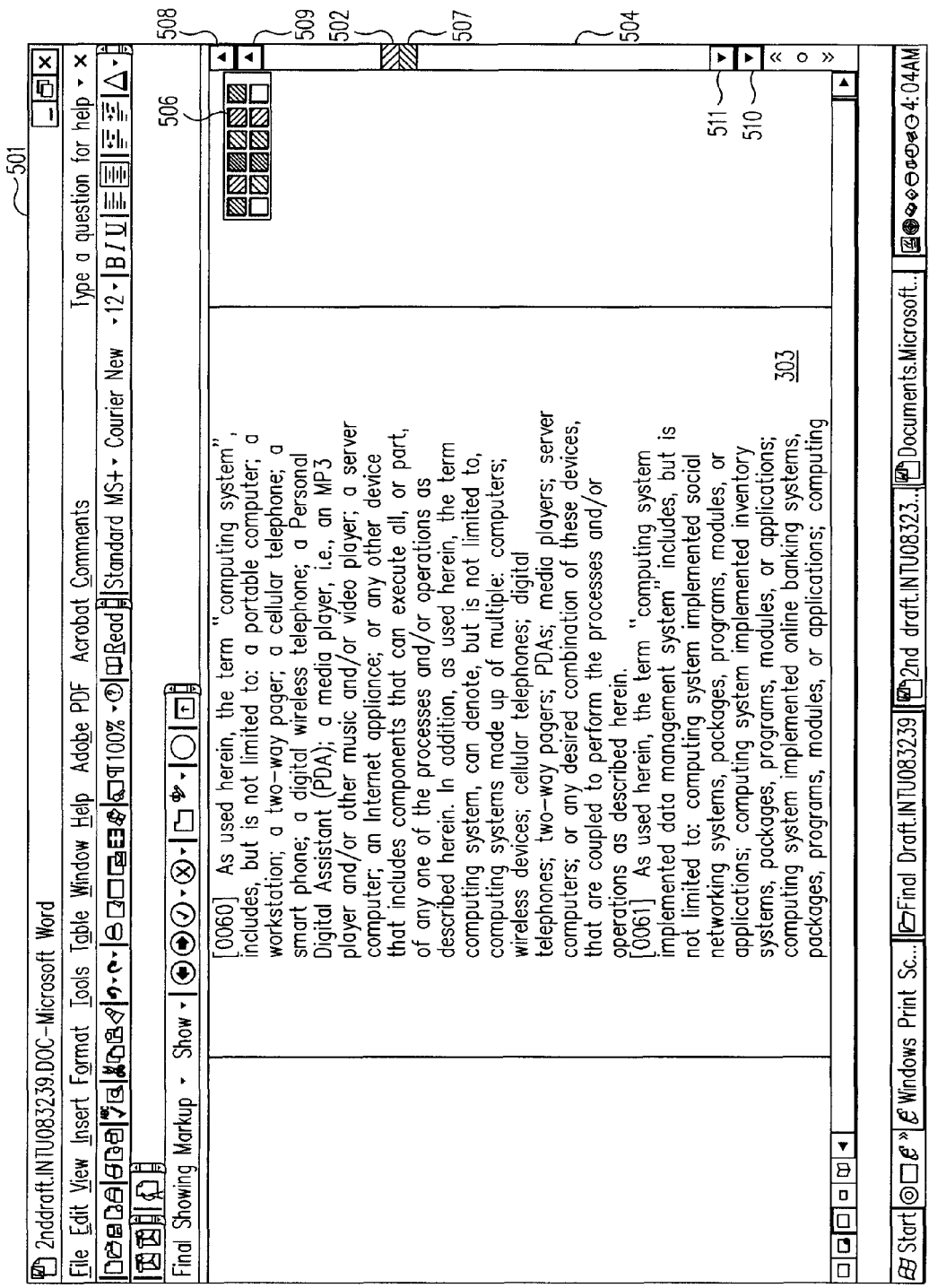
FIG. 5 is a display screen including an electronic document display and a bookmark enabled scroll bar in accordance with one embodiment.

FIG. 5 shows one specific example of an electronic document display including a bookmark enabled scroll bar 501 as would by displayed on a display screen in accordance with one embodiment.

As seen in FIG. 5, electronic document display including a bookmark enabled scroll bar 501 is substantially similar to electronic document display including a bookmark enabled scroll bar 401 of FIG. 4 and, like FIG. 4, includes, in this specific example, text display 303 that is a portion of an electronic document such as would be obtained, in one embodiment, at OBTAIN DATA REPRESENTING AN ELECTRONIC DOCUMENT OPERATION 203 and is displayed, in one embodiment, at DISPLAY AT LEAST PART OF THE ELECTRONIC DOCUMENT ON A DISPLAY SCREEN OPERATION 205. Returning to FIG. 5, as discussed above, in this specific example, text display 303, is part of a patent application electronic document and includes the definition of a "computing system" as defined in the patent application electronic document.

As also seen in FIG. 5, electronic document display including a bookmark enabled scroll bar 501 includes bookmark enabled scroll bar 504 that is one example of a bookmark enabled scroll bar as would be provided, in one embodiment, at PROVIDE A BOOKMARK ENABLED SCROLL BAR ASSOCIATED WITH THE AT LEAST PART OF THE ELECTRONIC DOCUMENT ON THE DISPLAY SCREEN OPERATION 207.

Returning to FIG. 5, in this specific example, bookmark enabled scroll bar 504 includes basic "up" scroll bar arrow 508 and basic "down" scroll bar arrow 510 and basic position indicator 502. As also seen in FIG. 5, bookmark enabled scroll bar 504 also includes bookmark color-coded sequencing buttons; "up" color-coded bookmark sequencing button 509 and "down" color-coded bookmark sequencing button 511. Also seen in FIG. 5 is color-coded visual indicator 507 and bookmark sequencing button selection display 506.

In this specific example, bookmark enabled scroll bar 504 includes bookmark sequencing button selection display 506 that, in one embodiment, appears in response to the user activating "up" color-coded bookmark sequencing button 509 using a user interface device, such as a mouse, keyboard, touch screen, or touch pad, to move a cursor over bookmark "up" color-coded bookmark sequencing button 509.

As previously discussed, "up" color-coded bookmark sequencing button 509 and "down" color-coded bookmark sequencing button 511 are used to move from any position in an electronic document to the next bookmarked section of the document in the direction indicated by the selected color-coded bookmark sequencing button 509 or 511 and the being of the selected color of bookmark sequencing button selection display 506.

Those of skill in the art will readily recognize that the specific display shown in FIG. 5 is exemplary only. In particular, the display screens and user interface elements shown in the FIG. 5 are in accordance with one illustrative example and other layouts, arrangements, formats, and user interface features may be provided without departing from the characteristics of the invention as set forth in the claims.

Returning to FIG. 2, other examples of actions a given user could take at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 to activate one of the bookmark sequencing buttons of DISPLAY AT LEAST ONE BOOKMARK SEQUENCING BUTTON ASSOCIATED WITH THE VISUAL INDICATOR IN THE BOOKMARK ENABLED SCROLL BAR OPERATION include, but are not limited to: voice commands; pressing a menu and/or function key on a remote control device; accessing a channel and/or link associated with the electronic document; or any other action/inaction on the part of the given user whereby a bookmark sequencing button is activated, as discussed herein, known/available in the art at the time of filing, or as developed after the time of filing.

In one embodiment, once the user activates one of the one or more bookmark sequencing buttons of DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217, process flow proceeds to IN RESPONSE TO THE USER ACTIVATING THE AT LEAST ONE BOOKMARK SEQUENCING BUTTON ASSOCIATED WITH THE VISUAL INDICATOR IN THE BOOKMARK ENABLED SCROLL BAR, RETURNING TO THE PORTION OF THE ELECTRONIC DOCUMENT THE USER DESIRED TO BOOKMARK FOR FUTURE REFERENCE OPERATION 219.

In one embodiment, at IN RESPONSE TO THE USER ACTIVATING THE AT LEAST ONE BOOKMARK SEQUENCING BUTTON ASSOCIATED WITH THE VISUAL INDICATOR IN THE BOOKMARK ENABLED SCROLL BAR, RETURNING TO THE PORTION OF THE ELECTRONIC DOCUMENT THE USER DESIRED TO BOOKMARK FOR FUTURE REFERENCE OPERATION 219 the user is taken to the corresponding portion of the electronic document of OBTAIN DATA REPRESENTING AN ELECTRONIC DOCUMENT OPERATION 203 the user had bookmarked at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 using the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207.

In one embodiment, at IN RESPONSE TO THE USER ACTIVATING THE AT LEAST ONE BOOKMARK SEQUENCING BUTTON ASSOCIATED WITH THE VISUAL INDICATOR IN THE BOOKMARK ENABLED SCROLL BAR, RETURNING TO THE PORTION OF THE ELECTRONIC DOCUMENT THE USER DESIRED TO BOOKMARK FOR FUTURE REFERENCE OPERATION 219 the user is taken to the portion of the electronic document corresponding to the next, or closest, bookmark associated with the activated bookmark sequencing button selected that is in the selected direction and/or of the selected color-code, symbol-code, or number-code.

As discussed above, in one embodiment, the at least one bookmark sequencing button displayed at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 takes the form of "up" and/or "down" arrow buttons that, in one embodiment, are provided in addition to the standard scroll bar "up" and "down" buttons as a second set of "up" and "down" arrows within the scroll bar itself.

Returning to FIG. 3, in this specific example, bookmark enabled scroll bar 304 includes basic "up" scroll bar arrow 308 and basic "down" scroll bar arrow 310 and basic position indicator 302. As also seen in FIG. 3, bookmark enabled scroll bar 304 also includes bookmark sequencing buttons; "up" bookmark sequencing button 309 and "down" bookmark sequencing button 311.

In one embodiment, when "up" bookmark sequencing button 309 and/or "down" bookmark sequencing button 311 are activated at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 (FIG. 2) the next bookmarked section of the document in the direction indicated by the selected bookmark sequencing button 309 or 311 (FIG. 3) is displayed at IN RESPONSE TO THE USER ACTIVATING THE AT LEAST ONE BOOKMARK SEQUENCING BUTTON ASSOCIATED WITH THE VISUAL INDICATOR IN THE BOOKMARK ENABLED SCROLL BAR, RETURNING TO THE PORTION OF THE ELECTRONIC DOCUMENT THE USER DESIRED TO BOOKMARK FOR FUTURE REFERENCE OPERATION 219 (FIG. 2).

As an example, in one embodiment, activating "up" bookmark sequencing button 309 (FIG. 3) at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 (FIG. 2) causes the display to move to the portion of the electronic document corresponding to the next bookmark and/or visual indicator in the "up", or preceding/backward, direction at IN RESPONSE TO THE USER ACTIVATING THE AT LEAST ONE BOOKMARK SEQUENCING BUTTON ASSOCIATED WITH THE VISUAL INDICATOR IN THE BOOKMARK ENABLED SCROLL BAR, RETURNING TO THE PORTION OF THE ELECTRONIC DOCUMENT THE USER DESIRED TO BOOKMARK FOR FUTURE REFERENCE OPERATION 219.

Likewise, in one embodiment, activating "down" bookmark sequencing button 311 (FIG. 3) at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 (FIG. 2) causes the display to move to the portion of the electronic document corresponding to the next bookmark and/or visual indicator in the "down", or forward, direction at IN RESPONSE TO THE USER ACTIVATING THE AT LEAST ONE BOOKMARK SEQUENCING BUTTON ASSOCIATED WITH THE VISUAL INDICATOR IN THE BOOKMARK ENABLED SCROLL BAR, RETURNING TO THE PORTION OF THE ELECTRONIC DOCUMENT THE USER DESIRED TO BOOKMARK FOR FUTURE REFERENCE OPERATION 219.

Returning to FIG. 2, as also discussed above, in one embodiment, the at least one bookmark sequencing button displayed at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 can be color-coded, symbol-coded, and/or number-coded arrows, blocks, or other symbols that, as discussed in more detail below, correspond to color-coded, and/or symbol-coded, and/or number-coded, bookmarks and/or bookmark visual indicators. In some of these embodiments, the color-coded, and/or symbol-coded, and/or number-coded, bookmark sequencing buttons correspond to specific portions/topics of the electronic document. In some of these embodiments, the color-coded, and/or symbol-coded, and/or number-coded, bookmarks correspond to different users and a given user can filter out all user bookmarks except those created by designated users, including the given user. In some of these embodiments, the color-coded, and/or symbol-coded, and/or number-coded, bookmarks correspond to any coding scheme desired by the user.

Referring to FIG. 4, bookmark enabled scroll bar 404 includes basic "up" scroll bar arrow 408 and basic "down" scroll bar arrow 410 and basic position indicator 402. As also seen in FIG. 4, bookmark enabled scroll bar 404 also includes bookmark color-coded sequencing buttons; "up" color-coded bookmark sequencing button 409 and "down" color-coded bookmark sequencing button 411. Also seen in FIG. 4 is color-coded visual indicator 407 and color-coded bookmark selector display 405.

In this specific example, "up" color-coded bookmark sequencing button 409, "down" color-coded bookmark sequencing button 411, and color-coded visual indicator 407 are of the same color as selected by the user using color-coded bookmark selector display 405. In this specific example, bookmark enabled scroll bar 404 includes color-coded bookmark selector display 405 that, in one embodiment, appears in response to the user activating bookmark enabled scroll bar 404 at a location corresponding to the portion of the electronic document the user wishes to bookmark for future reference using a user interface device, such as a mouse, keyboard, touch screen, or touch pad, to move a cursor over bookmark enabled scroll bar 404 at a location corresponding to the portion of the electronic document desired to be bookmarked, in this instance the definition of "computing system" displayed in text display 303. In one embodiment, the user can add a bookmark, and select a color for the bookmark, "up" color-coded bookmark sequencing button 409, "down" color-coded bookmark sequencing button 411, and color-coded visual indicator 407, for text display 303 by clicking, or otherwise activating, any of the colors displayed in the color selection pallet 412 of color-coded bookmark selector display 405.

In one embodiment "up" color-coded bookmark sequencing button 409 and "down" color-coded bookmark sequencing button 411 are used to move from any position in an electronic document to the next bookmarked section of the document in the direction indicated by the selected color-coded bookmark sequencing button 409 or 411 and the being of the selected color of color selection pallet 412 of color-coded bookmark selector display 405 at IN RESPONSE TO THE USER ACTIVATING THE AT LEAST ONE BOOKMARK SEQUENCING BUTTON ASSOCIATED WITH THE VISUAL INDICATOR IN THE BOOKMARK ENABLED SCROLL BAR, RETURNING TO THE PORTION OF THE ELECTRONIC DOCUMENT THE USER DESIRED TO BOOKMARK FOR FUTURE REFERENCE OPERATION 219 (FIG. 2).

For example, returning to FIG. 4, assume that in this specific example, "up" color-coded bookmark sequencing button 409, "down" color-coded bookmark sequencing button 411, and color-coded visual indicator 407 are color-coded as black. Then in this specific example, activating "up" color-coded bookmark sequencing button 409 at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 (FIG. 2) causes the display to move to the portion of the electronic document corresponding to the next black bookmark and/or visual indicator in the "up", or preceding/backward, direction at IN RESPONSE TO THE USER ACTIVATING THE AT LEAST ONE BOOKMARK SEQUENCING BUTTON ASSOCIATED WITH THE VISUAL INDICATOR IN THE BOOKMARK ENABLED SCROLL BAR, RETURNING TO THE PORTION OF THE ELECTRONIC DOCUMENT THE USER DESIRED TO BOOKMARK FOR FUTURE REFERENCE OPERATION 219 (FIG. 2) while skipping any intervening bookmarks and/or visual indicators of any color other than black.

Likewise, in this specific example, activating "down" color-coded bookmark sequencing button 409 (FIG. 4) at THE USER ACTIVATES THE AT LEAST ONE BOOKMARK SEQUENCING BUTTON ASSOCIATED WITH THE VISUAL INDICATOR IN THE BOOKMARK ENABLED SCROLL BAR OPERATION 217 (FIG. 2) causes the display to move to the portion of the electronic document corresponding to the next black bookmark and/or visual indicator in the "down", or forward, direction at IN RESPONSE TO THE USER ACTIVATING THE AT LEAST ONE BOOKMARK SEQUENCING BUTTON ASSOCIATED WITH THE VISUAL INDICATOR IN THE BOOKMARK ENABLED SCROLL BAR, RETURNING TO THE PORTION OF THE ELECTRONIC DOCUMENT THE USER DESIRED TO BOOKMARK FOR FUTURE REFERENCE OPERATION 219 (FIG. 2) while skipping any intervening bookmarks and/or visual indicators of any color other than black.

Returning to FIG. 2, as noted above, in various embodiments, the at least one bookmark sequencing button displayed at DISPLAY AT LEAST ONE BOOKMARK SEQUENCING BUTTON ASSOCIATED WITH THE VISUAL INDICATOR IN THE BOOKMARK ENABLED SCROLL BAR OPERATION 215 takes the form of any symbol.

As also discussed above, in one embodiment, a user can select a color-coded, symbol-coded, and/or number-coded bookmark sequencing button of a specific color, symbol, or number via a bookmark sequencing button selection display. In one embodiment, the cursor acts as a "tool tip" to cause selectable features, such as a color code, symbol code, or number code, of the desired bookmark sequencing button to be displayed and/or made user selectable.

In one embodiment, once the user is taken to the corresponding portion of the electronic document of OBTAIN DATA REPRESENTING AN ELECTRONIC DOCUMENT OPERATION 203 the user had bookmarked at THE USER CREATES A BOOKMARK IN THE BOOKMARK ENABLED SCROLL BAR AT A LOCATION CORRESPONDING TO THE PORTION OF THE ELECTRONIC DOCUMENT THE USER DESIRES TO BOOKMARK FOR FUTURE REFERENCE OPERATION 211 using the bookmark enabled scroll bar of PROVIDE A BOOKMARK ENABLED SCROLL BAR ASSOCIATED WITH THE AT LEAST PART OF THE ELECTRONIC DOCUMENT ON THE DISPLAY SCREEN OPERATION 207 at IN RESPONSE TO THE USER ACTIVATING THE AT LEAST ONE BOOKMARK SEQUENCING BUTTON ASSOCIATED WITH THE VISUAL INDICATOR IN THE BOOKMARK ENABLED SCROLL BAR, RETURNING TO THE PORTION OF THE ELECTRONIC DOCUMENT THE USER DESIRED TO BOOKMARK FOR FUTURE REFERENCE OPERATION 219, process flow proceeds to EXIT OPERATION 221.

In one embodiment, at EXIT OPERATION 221 process for providing scroll bar enabled bookmarks in electronic document displays 200 is exited to await new data and/or the user selection of a new bookmark and/or a new activation of a bookmark sequencing button.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing scroll bar enabled bookmarks in electronic document displays 200, the reader/reviewer of the electronic document, i.e., a user of the process for providing scroll bar enabled bookmarks in electronic document displays, is provided a dedicated, simple, and unobtrusive capability to bookmark a given location in the electronic document so that the user can return to the bookmarked location quickly and without having to scroll through the document and search for the given section of interest. In addition, in some embodiments, one or more users can code multiple bookmarks by subject matter and/or the user creating the bookmark.

Consequently, using process for providing scroll bar enabled bookmarks in electronic document displays 200, a user can repeatedly return to any desired portion of even very complicated and/or large documents without resorting to the time consuming search and find processes currently employed, and without breaking their concentration, losing their focus, and/or losing the context.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "activating", "storing", "saving", "displaying", "categorizing", "providing", "aggregating", "modifying", "accessing", "selecting" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing scroll bar enabled bookmarks in electronic document displays comprising:

obtaining data representing an electronic document;

displaying at least part of the electronic document to a user on a display screen;

providing a bookmark enabled scroll bar on the display screen displaying at least part of the electronic document, the bookmark enabled scroll bar being configured to be activated by the user at one or more locations to create a bookmark corresponding to at least a portion of the electronic document;

providing the user with the capability activate the bookmark enabled scroll bar and create a bookmark at a location in the bookmark enabled scroll bar corresponding to a portion of the electronic document the user desires to bookmark;

in response to the user activating a location in the bookmark enabled scroll bar corresponding to a portion of the electronic document the user desires to bookmark, bookmarking the portion of the electronic document the user desires to bookmark and generating and displaying a bookmark visual indicator in the bookmark enabled scroll bar at the location in the bookmark enabled scroll bar corresponding to the portion of the electronic document the user desires to bookmark;

displaying at least one bookmark sequencing button associated with the bookmark visual indicator, the bookmark sequencing button being separate and distinct from a bookmark, the bookmark sequencing button being associated with one of either an up or down direction;

providing the user with the capability to activate the bookmark sequencing button associated with the bookmark visual indicator;

in response to the user activating the bookmark sequencing button, returning to a closest bookmarked portion of the electronic document the user bookmarked, as indicated by a bookmark visual indicator in the bookmark enabled scroll bar, that is consistent with the activated bookmark sequencing button; and displaying the closest bookmarked portion of the electronic document, wherein the closest bookmarked portion is determined using a present position and the nearest bookmark in the direction associated with the activated bookmark sequencing button, as indicated by a bookmark visual indicator in the bookmark enabled scroll bar, which is consistent with the activated bookmark sequencing button on the display screen.

2. The computing system implemented process for providing scroll bar enabled bookmarks in electronic document displays of claim 1, wherein:

at least part of the electronic document is chosen from the group of electronic documents consisting of:

an electronic media based version of a trade and/or professional document, or any portion thereof;

an electronic media based version of a work of fiction, or any portion thereof;

an electronic media based version of a work of non-fiction, or any portion thereof;

an electronic media based version of a school textbook, or any portion thereof;

an electronic media based version of a business document, or any portion thereof;

an electronic media based version of a presentation, or any portion thereof;

an electronic media based version of a news article, or any portion thereof;

an electronic media based version of a shared work and/or private document, or any portion thereof;

an electronic media based version of a legal document, or any portion thereof;

an electronic media based version of a spreadsheet document, or any portion thereof and any document containing at least one word of electronic media based text.

3. The computing system implemented process for providing scroll bar enabled bookmarks in electronic document displays of claim 1, wherein:

at least part of the data representing at least part of an electronic document is obtained from one or more sources of an electronic document selected from the group of sources of an electronic document consisting of:

a computing system implemented data management system;

a computing system implemented word processing system;

a computing system implemented document display system;

a database;

a computing system;

a server system;

a web-site or other web-based system;

a computer program product;

the Internet;

a network of computing systems and/or server systems;

e-mail;

text messaging; and screen scraping.

4. The computing system implemented process for providing scroll bar enabled bookmarks in electronic document displays of claim 1, wherein:

at least part of the data representing at least part of the electronic document is obtained from a seller of electronic documents.

5. The computing system implemented process for providing scroll bar enabled bookmarks in electronic document displays of claim 1, wherein:

the display screen is associated with a computing system.

6. The computing system implemented process for providing scroll bar enabled bookmarks in electronic document displays of claim 5, wherein:

the bookmark enabled scroll bar is activated by the user through the display screen using a user interface device.

7. The computing system implemented process for providing scroll bar enabled bookmarks in electronic document displays of claim 1, wherein:

the bookmark visual indicator is coded using one or more coding methods in accordance with one or more coding schemes.

8. The computing system implemented process for providing scroll bar enabled bookmarks in electronic document displays of claim 1, wherein:

the at least one bookmark sequencing button includes two bookmark sequencing buttons, each of the two bookmark sequencing buttons being an arrow indicating a direction within the electronic document, a first bookmark sequencing button indicating an upward direction within the electronic document and a second bookmark sequencing button indicating a downward ward direction within the electronic document.

9. The computing system implemented process for providing scroll bar enabled bookmarks in electronic document displays of claim 7, wherein:
at least one of the at least one bookmark sequencing buttons associated with the bookmark visual indicator is coded using the same one or more coding methods used to code the bookmark visual indicator and in accordance with the one or more coding schemes used to code the bookmark visual indicator.

10. The computing system implemented process for providing scroll bar enabled bookmarks in electronic document displays of claim 9, wherein:
the bookmark visual indicator is coded by one or more of coding methods selected from the group of coding methods consisting of:
color-coding;
symbol coding; and
number coding.

11. The computing system implemented process for providing scroll bar enabled bookmarks in electronic document displays of claim 9, wherein:
the bookmark visual indicator is coded according to one or more coding schemes selected from the group of coding schemes consisting of:
the topic associated with the bookmarked portion of the electronic document the user bookmarked as indicated by the bookmark visual indicator symbol;
the user creating the bookmark; and
any coding scheme desired by one or more users.

12. The computing system implemented process for providing scroll bar enabled bookmarks in electronic document displays of claim 9, wherein:
in response to the user activating the bookmark sequencing button, returning to a closest bookmarked portion of the electronic document the user bookmarked as indicated by a bookmark visual indicator in the bookmark enabled scroll bar that is consistent with a direction in the document indicated by the activated bookmark sequencing button and that is consistent with the code associated with the bookmark sequencing button.

13. The computing system implemented process for providing scroll bar enabled bookmarks in electronic document displays of claim 1, wherein:
the user activates the bookmark sequencing button associated with the bookmark visual indicator through the display screen using a user interface device.

14. A system for providing scroll bar enabled bookmarks in electronic document displays comprising:
a computing system;
a display screen;
a computing system;
a computing system implemented data management system;
and
a processor for executing a process for providing scroll bar enabled bookmarks in electronic document displays, the process for providing scroll bar enabled bookmarks in electronic document displays comprising:
obtaining data representing an electronic document;
displaying at least part of the electronic document to a user on the display screen using the computing system implemented data management system;
providing a bookmark enabled scroll bar on the display screen displaying at least part of the electronic document, the bookmark enabled scroll bar being capable of being activated by the user at one or more locations to create a bookmark corresponding to at least a portion of the electronic document;
providing the user with the capability activate the bookmark enabled scroll bar and create a bookmark at a location in the bookmark enabled scroll bar corresponding to a portion of the electronic document the user desires to bookmark;
in response to the user activating a location in the bookmark enabled scroll bar corresponding to a portion of the electronic document the user desires to bookmark, bookmarking the portion of the electronic document the user desires to bookmark and generating and displaying a bookmark visual indicator in the bookmark enabled scroll bar at the location in the bookmark enabled scroll bar corresponding to the portion of the electronic document the user desires to bookmark;
displaying at least one bookmark sequencing button associated with the bookmark visual indicator, the bookmark sequencing button being separate and distinct from a bookmark, the bookmark sequencing button being associated with one of either an up or down direction;
providing the user with the capability to activate the bookmark sequencing button associated with the bookmark visual indicator;
in response to the user activating the bookmark sequencing button, returning to a closest bookmarked portion of the electronic document, wherein the closest bookmarked portion is determined using a present position and the nearest bookmark in the direction associated with the activated bookmark sequencing button, as indicated by a bookmark visual indicator in the bookmark enabled scroll bar, that is consistent with the activated bookmark sequencing button; and
displaying the closest bookmarked portion of the electronic document the user bookmarked, as indicated by a bookmark visual indicator in the bookmark enabled scroll bar, which is consistent with the activated bookmark sequencing button on the display screen.

15. The system for providing scroll bar enabled bookmarks in electronic document displays of claim 14, wherein:
at least part of the electronic document is chosen from the group of electronic documents consisting of:
an electronic media based version of a trade and/or professional document, or any portion thereof;
an electronic media based version of a work of fiction, or any portion thereof;
an electronic media based version of a work of non-fiction, or any portion thereof;
an electronic media based version of a school textbook, or any portion thereof;
an electronic media based version of a business document, or any portion thereof;
an electronic media based version of a presentation, or any portion thereof;
an electronic media based version of a news article, or any portion thereof;
an electronic media based version of a shared work and/or private document, or any portion thereof;
an electronic media based version of a legal document, or any portion thereof;
an electronic media based version of a spreadsheet document, or any portion thereof and
any document containing at least one word of electronic media based text.

16. The system for providing scroll bar enabled bookmarks in electronic document displays of claim 14, wherein:
    at least part of the data representing at least part of the electronic document is obtained from a seller of electronic documents.

17. The system for providing scroll bar enabled bookmarks in electronic document displays of claim 14, wherein:
    the bookmark visual indicator is coded using one or more coding methods in accordance with one or more coding schemes.

18. The system for providing scroll bar enabled bookmarks in electronic document displays of claim 14, wherein:
    the at least one bookmark sequencing button includes two bookmark sequencing buttons, each of the two bookmark sequencing buttons being an arrow indicating a direction within the electronic document, a first bookmark sequencing button indicating an upward direction within the electronic document and a second bookmark sequencing button indicating a downward ward direction within the electronic document.

19. The system for providing scroll bar enabled bookmarks in electronic document displays of claim 17, wherein:
    at least one of the at least one bookmark sequencing buttons associated with the bookmark visual indicator is coded using the same one or more coding methods used to code the bookmark visual indicator and in accordance with the one or more coding schemes used to code the bookmark visual indicator.

20. The system for providing scroll bar enabled bookmarks in electronic document displays of claim 19, wherein:
    the bookmark visual indicator is coded by one or more of coding methods selected from the group of coding methods consisting of:
    color-coding;
    symbol coding; and
    number coding.

21. The system for providing scroll bar enabled bookmarks in electronic document displays of claim 19, wherein:
    the bookmark visual indicator is coded according to one or more coding schemes selected from the group of coding schemes consisting of:
    the topic associated with the bookmarked portion of the electronic document the user bookmarked as indicated by the bookmark visual indicator symbol;
    the user creating the bookmark; and
    any coding scheme desired by one or more users.

22. The system for providing scroll bar enabled bookmarks in electronic document displays of claim 19, wherein:
    in response to the user activating the bookmark sequencing button, returning to a closest bookmarked portion of the electronic document the user bookmarked as indicated by a bookmark visual indicator in the bookmark enabled scroll bar that is consistent with a direction in the document indicated by the activated bookmark sequencing button and that is consistent with the code associated with the bookmark sequencing button.

23. The system for providing scroll bar enabled bookmarks in electronic document displays of claim 14, wherein:
    in response to the user activating the bookmark sequencing button, returning to a closest bookmarked portion of the electronic document the user bookmarked as indicated by a bookmark visual indicator in the bookmark enabled scroll bar that is consistent with a direction in the document indicated by the activated bookmark sequencing button.

24. A computer program product for providing scroll bar enabled bookmarks in electronic document displays comprising:
    a nontransitory computer readable medium;
    and computer program code, encoded on the computer readable medium, comprising computer readable instructions which when executed by a processor perform a process for:
    obtaining data representing an electronic document;
    displaying at least part of the electronic document to a user on a display screen;
    providing a bookmark enabled scroll bar on the display screen displaying at least part of the electronic document, the bookmark enabled scroll bar being capable of being activated by the user at one or more locations to create a bookmark corresponding to at least a portion of the electronic document;
    providing the user with the capability activate the bookmark enabled scroll bar and create a bookmark at a location in the bookmark enabled scroll bar corresponding to a portion of the electronic document the user desires to bookmark;
    in response to the user activating a location in the bookmark enabled scroll bar corresponding to a portion of the electronic document the user desires to bookmark, bookmarking the portion of the electronic document the user desires to bookmark and generating and displaying a bookmark visual indicator in the bookmark enabled scroll bar at the location in the bookmark enabled scroll bar corresponding to the portion of the electronic document the user desires to bookmark;
    displaying at least one bookmark sequencing button associated with the bookmark visual indicator, the bookmark sequencing button being separate and distinct from a bookmark, the bookmark sequencing button being associated with one of either an up or down direction;
    providing the user with the capability to activate the bookmark sequencing button associated with the bookmark visual indicator;
    in response to the user activating the bookmark sequencing button, returning to a closest bookmarked portion of the electronic document, wherein the closest bookmarked portion is determined using a present position and the nearest bookmark in the direction associated with the activated bookmark sequencing button, as indicated by a bookmark visual indicator in the bookmark enabled scroll bar, that is consistent with the activated bookmark sequencing button; and
    displaying the closest bookmarked portion of the electronic document the user bookmarked, as indicated by a bookmark visual indicator in the bookmark enabled scroll bar, which is consistent with the activated bookmark sequencing button on the display screen.

25. The computer program product for providing scroll bar enabled bookmarks in electronic document displays of claim 24, wherein:
    at least part of the electronic document is chosen from the group of electronic documents consisting of:
    an electronic media based version of a trade and/or professional document, or any portion thereof;
    an electronic media based version of a work of fiction, or any portion thereof;
    an electronic media based version of a work of non-fiction, or any portion thereof;
    an electronic media based version of a school textbook, or any portion thereof;

an electronic media based version of a business document, or any portion thereof;

an electronic media based version of a presentation, or any portion thereof;

an electronic media based version of a news article, or any portion thereof;

an electronic media based version of a shared work and/or private document, or any portion thereof;

an electronic media based version of a legal document, or any portion thereof;

an electronic media based version of a spreadsheet document, or any portion thereof and any document containing at least one word of electronic media based text.

26. The computer program product for providing scroll bar enabled bookmarks in electronic document displays of claim 24, wherein:

the bookmark visual indicator is coded using one or more coding methods in accordance with one or more coding schemes.

27. The computer program product for providing scroll bar enabled bookmarks in electronic document displays of claim 26, wherein:

at least one of the at least one bookmark sequencing buttons associated with the bookmark visual indicator is coded using the same one or more coding methods used to code the bookmark visual indicator and in accordance with the one or more coding schemes used to code the bookmark visual indicator.

28. The computer program product for providing scroll bar enabled bookmarks in electronic document displays of claim 27, wherein:

the bookmark visual indicator is coded by one or more of coding methods selected from the group of coding methods consisting of:
color-coding;
symbol coding; and
number coding.

29. The computer program product for providing scroll bar enabled bookmarks in electronic document displays of claim 27, wherein:

the bookmark visual indicator is coded according to one or more coding schemes selected from the group of coding schemes consisting of:
the topic associated with the bookmarked portion of the electronic document the user bookmarked as indicated by the bookmark visual indicator symbol;
the user creating the bookmark; and
any coding scheme desired by one or more users.

30. The computer program product for providing scroll bar enabled bookmarks in electronic document displays of claim 27, wherein:

in response to the user activating the bookmark sequencing button, returning to a closest bookmarked portion of the electronic document the user bookmarked as indicated by a bookmark visual indicator in the bookmark enabled scroll bar that is consistent with a direction in the document indicated by the activated bookmark sequencing button and that is consistent with the code associated with the bookmark sequencing button.

31. The computer program product for providing scroll bar enabled bookmarks in electronic document displays of claim 24, wherein:

the at least one bookmark sequencing button includes two bookmark sequencing buttons, each of the two bookmark sequencing buttons being an arrow indicating a direction within the electronic document, a first bookmark sequencing button indicating an upward direction within the electronic document and a second bookmark sequencing button indicating a downward ward direction within the electronic document.

32. The computer program product for providing scroll bar enabled bookmarks in electronic document displays of claim 24, wherein:

in response to the user activating the bookmark sequencing button, returning to a closest bookmarked portion of the electronic document the user bookmarked as indicated by a bookmark visual indicator in the bookmark enabled scroll bar that is consistent with a direction in the document indicated by the activated bookmark sequencing button.

* * * * *

UNITED STATES PATENT AND TRADEMARK OFFICE
CERTIFICATE OF CORRECTION

PATENT NO. : 8,196,061 B1  
APPLICATION NO. : 12/346501  
DATED : June 5, 2012  
INVENTOR(S) : Narendran Bhojan It is certified that error appears in the above-identified patent and that said Letters Patent is hereby corrected as shown below:

In the Claims

In Column 39, Line 1, Claim 8, after "downward", delete "ward";
In Column 39, Line 53, Claim 14, delete "a computing system";
In Column 40, Line 4, Claim 14, between "capability" and "activate", insert --to--; and
In Column 42, Line 18, Claim 24, between "capability" and "activate", insert --to--.

Signed and Sealed this
Third Day of June, 2014

Michelle K. Lee
*Deputy Director of the United States Patent and Trademark Office*